United States Patent
Kim et al.

(10) Patent No.: US 9,243,774 B2
(45) Date of Patent: *Jan. 26, 2016

(54) LIGHT GUIDES AND BACKLIGHT SYSTEMS INCORPORATING PRISMATIC STRUCTURES AND LIGHT REDIRECTORS

(71) Applicant: Pixtronix, Inc., San Diego, CA (US)

(72) Inventors: Je Hong Kim, Lexington, MA (US); Jignesh Gandhi, Burlington, MA (US)

(73) Assignee: Pixtronix, Inc., San Diego, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/891,492

(22) Filed: May 10, 2013

(65) Prior Publication Data

US 2013/0250619 A1 Sep. 26, 2013

Related U.S. Application Data

(63) Continuation of application No. 13/542,976, filed on Jul. 6, 2012, now Pat. No. 8,441,602, which is a continuation of application No. 12/258,206, filed on Oct. 24, 2008, now Pat. No. 8,248,560.

(60) Provisional application No. 61/124,168, filed on Apr. 14, 2008.

(51) Int. Cl.
*F21V 7/04* (2006.01)
*F21V 8/00* (2006.01)

(52) U.S. Cl.
CPC ............ *F21V 7/04* (2013.01); *G02B 6/0061* (2013.01); *G02B 6/0036* (2013.01); *G02B 6/0038* (2013.01); *G02B 6/0053* (2013.01)

(58) Field of Classification Search
USPC ............. 362/606, 607, 618, 627, 97.2
See application file for complete search history.

(56) References Cited

U.S. PATENT DOCUMENTS

| | | |
|---|---|---|
| 4,067,043 A | 1/1978 | Perry |
| 4,074,253 A | 2/1978 | Nadir |
| 4,559,535 A | 12/1985 | Watkins et al. |
| 4,564,836 A | 1/1986 | Vuilleumier et al. |
| 4,582,396 A | 4/1986 | Bos et al. |
| 4,673,253 A | 6/1987 | Tanabe et al. |
| 4,744,640 A | 5/1988 | Phillips |
| 4,958,911 A | 9/1990 | Beiswenger et al. |
| 4,991,941 A | 2/1991 | Kalmanash |
| 5,005,108 A | 4/1991 | Pristash et al. |

(Continued)

FOREIGN PATENT DOCUMENTS

| | | | |
|---|---|---|---|
| EP | 0366847 A2 | 5/1990 | |
| EP | 0359450 B1 | 11/1994 | |

(Continued)

OTHER PUBLICATIONS

Akimoto O. et al., "15.1: A 0.9-in UXGA/HDTV FLC Microdisplay," Society for Information Display, 2000, pp. 194-197.

(Continued)

*Primary Examiner* — Laura Tso
(74) *Attorney, Agent, or Firm* — Weaver Austin Villeneuve & Sampson, LLP

(57) ABSTRACT

Improved apparatus and method for collecting and directing light from a source via a light guide and modulated display assembly in an efficient manner through the design and use of prismatic optical structures, diffusers and/or light redirectors.

17 Claims, 9 Drawing Sheets

(56) References Cited

U.S. PATENT DOCUMENTS

| | | |
|---|---|---|
| 5,042,900 A | 8/1991 | Parker |
| 5,044,734 A | 9/1991 | Sperl et al. |
| 5,050,946 A | 9/1991 | Hathaway et al. |
| 5,061,049 A | 10/1991 | Hornbeck |
| 5,062,689 A | 11/1991 | Koehler |
| 5,078,479 A | 1/1992 | Vuilleumier |
| 5,093,652 A | 3/1992 | Bull et al. |
| 5,096,279 A | 3/1992 | Hornbeck et al. |
| 5,128,787 A | 7/1992 | Blonder |
| 5,136,480 A | 8/1992 | Pristash et al. |
| 5,136,751 A | 8/1992 | Coyne et al. |
| 5,142,405 A | 8/1992 | Hornbeck |
| 5,198,730 A | 3/1993 | Vancil |
| 5,202,950 A | 4/1993 | Arego et al. |
| 5,233,385 A | 8/1993 | Sampsell |
| 5,233,459 A | 8/1993 | Bozler et al. |
| 5,278,652 A | 1/1994 | Urbanus et al. |
| 5,280,277 A | 1/1994 | Hornbeck |
| 5,319,491 A | 6/1994 | Selbrede |
| 5,339,116 A | 8/1994 | Urbanus et al. |
| 5,339,179 A | 8/1994 | Rudisill et al. |
| 5,359,345 A | 10/1994 | Hunter |
| 5,396,350 A | 3/1995 | Beeson et al. |
| 5,416,631 A | 5/1995 | Yagi |
| 5,440,197 A | 8/1995 | Gleckman |
| 5,452,024 A | 9/1995 | Sampsell |
| 5,461,411 A | 10/1995 | Florence et al. |
| 5,465,175 A | 11/1995 | Woodgate et al. |
| 5,467,104 A | 11/1995 | Furness, III |
| 5,477,086 A | 12/1995 | Rostoker et al. |
| 5,479,279 A | 12/1995 | Barbier et al. |
| 5,493,439 A | 2/1996 | Engle |
| 5,497,172 A | 3/1996 | Doherty et al. |
| 5,504,389 A | 4/1996 | Dickey |
| 5,510,824 A | 4/1996 | Nelson |
| 5,519,565 A | 5/1996 | Kalt et al. |
| 5,523,803 A | 6/1996 | Urbanus et al. |
| 5,526,051 A | 6/1996 | Gove et al. |
| 5,528,262 A | 6/1996 | McDowall et al. |
| 5,548,301 A | 8/1996 | Kornher et al. |
| 5,548,670 A | 8/1996 | Koike |
| 5,559,389 A | 9/1996 | Spindt et al. |
| 5,568,964 A | 10/1996 | Parker et al. |
| 5,578,185 A | 11/1996 | Bergeron et al. |
| 5,579,035 A | 11/1996 | Beiswenger |
| 5,579,240 A | 11/1996 | Buus |
| 5,584,556 A | 12/1996 | Yokoyama et al. |
| 5,591,049 A | 1/1997 | Dohnishi |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,629,784 A | 5/1997 | Abileah et al. |
| 5,655,832 A | 8/1997 | Pelka et al. |
| 5,659,327 A | 8/1997 | Furness, III |
| 5,666,226 A | 9/1997 | Ezra et al. |
| 5,684,354 A | 11/1997 | Gleckman |
| 5,724,062 A | 3/1998 | Hunter |
| 5,731,802 A | 3/1998 | Aras et al. |
| 5,745,193 A | 4/1998 | Urbanus et al. |
| 5,745,203 A | 4/1998 | Valliath et al. |
| 5,745,281 A | 4/1998 | Yi et al. |
| 5,771,321 A | 6/1998 | Stern |
| 5,781,331 A | 7/1998 | Carr et al. |
| 5,784,189 A | 7/1998 | Bozler et al. |
| 5,794,761 A | 8/1998 | Renaud et al. |
| 5,801,792 A | 9/1998 | Smith et al. |
| 5,835,255 A | 11/1998 | Miles |
| 5,835,256 A | 11/1998 | Huibers |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,990,990 A | 11/1999 | Crabtree |
| 6,008,781 A | 12/1999 | Furness, III |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,055,090 A | 4/2000 | Miles |
| 6,068,382 A | 5/2000 | Fukui et al. |
| 6,079,838 A | 6/2000 | Parker et al. |
| 6,154,586 A | 11/2000 | MacDonald et al. |
| 6,158,867 A | 12/2000 | Parker et al. |
| 6,162,657 A | 12/2000 | Schiele et al. |
| 6,167,182 A | 12/2000 | Shinohara et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,296,383 B1 | 10/2001 | Henningsen |
| 6,300,154 B2 | 10/2001 | Clark et al. |
| 6,317,103 B1 | 11/2001 | Furness, III |
| 6,323,834 B1 | 11/2001 | Colgan et al. |
| 6,329,967 B1 | 12/2001 | Little et al. |
| 6,367,940 B1 | 4/2002 | Parker et al. |
| 6,379,016 B1 | 4/2002 | Boyd et al. |
| 6,388,661 B1 | 5/2002 | Richards |
| 6,402,335 B1 | 6/2002 | Kalantar et al. |
| 6,404,942 B1 | 6/2002 | Edwards et al. |
| 6,424,329 B1 | 7/2002 | Okita |
| 6,429,625 B1 | 8/2002 | LeFevre et al. |
| 6,454,452 B1 | 9/2002 | Sasagawa et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,485,157 B2 | 11/2002 | Ohkawa |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,523,961 B2 | 2/2003 | Ilkov et al. |
| 6,529,265 B1 | 3/2003 | Henningsen |
| 6,531,947 B1 | 3/2003 | Weaver et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Whitney et al. |
| 6,582,095 B1 | 6/2003 | Toyoda |
| 6,583,915 B1 | 6/2003 | Hong et al. |
| 6,589,625 B1 | 7/2003 | Kothari et al. |
| 6,591,049 B2 | 7/2003 | Williams et al. |
| 6,600,474 B1 | 7/2003 | Heines et al. |
| 6,633,301 B1 | 10/2003 | Dallas et al. |
| 6,639,570 B2 | 10/2003 | Furness, III |
| 6,639,572 B1 | 10/2003 | Little et al. |

(56) References Cited

U.S. PATENT DOCUMENTS

| | | |
|---|---|---|
| 6,650,455 B2 | 11/2003 | Miles |
| 6,650,822 B1 | 11/2003 | Zhou |
| 6,671,078 B2 | 12/2003 | Flanders et al. |
| 6,674,562 B1 | 1/2004 | Miles |
| 6,677,709 B1 | 1/2004 | Ma et al. |
| 6,678,021 B2 | 1/2004 | Ohkawa |
| 6,680,792 B2 | 1/2004 | Miles |
| 6,687,896 B1 | 2/2004 | Royce et al. |
| 6,690,422 B1 | 2/2004 | Daly et al. |
| 6,701,039 B2 | 3/2004 | Bourgeois et al. |
| 6,707,176 B1 | 3/2004 | Rodgers |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,534 B2 | 6/2004 | Veligdan et al. |
| 6,755,547 B2 | 6/2004 | Parker |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,809,851 B1 | 10/2004 | Gurcan |
| 6,819,465 B2 | 11/2004 | Clikeman et al. |
| 6,825,470 B1 | 11/2004 | Bawolek et al. |
| 6,827,456 B2 | 12/2004 | Parker et al. |
| 6,831,678 B1 | 12/2004 | Travis |
| 6,835,111 B2 | 12/2004 | Ahn et al. |
| 6,846,082 B2 | 1/2005 | Glent-Madsen et al. |
| 6,846,089 B2 | 1/2005 | Stevenson et al. |
| 6,847,425 B2 | 1/2005 | Tanada et al. |
| 6,852,095 B1 | 2/2005 | Ray |
| 6,857,751 B2 | 2/2005 | Penn et al. |
| 6,859,625 B2 | 2/2005 | Sawada |
| 6,863,219 B1 | 3/2005 | Jacobsen et al. |
| 6,864,618 B2 | 3/2005 | Miller et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Yamada et al. |
| 6,897,164 B2 | 5/2005 | Baude et al. |
| 6,900,072 B2 | 5/2005 | Patel et al. |
| 6,906,847 B2 | 6/2005 | Huibers et al. |
| 6,908,204 B2 | 6/2005 | Kraft |
| 6,911,891 B2 | 6/2005 | Qiu et al. |
| 6,911,964 B2 | 6/2005 | Lee et al. |
| 6,919,981 B2 | 7/2005 | Clikeman et al. |
| 6,934,080 B2 | 8/2005 | Saccomanno et al. |
| 6,936,968 B2 | 8/2005 | Cross et al. |
| 6,939,013 B2 | 9/2005 | Asao |
| 6,940,631 B2 | 9/2005 | Ishikawa |
| 6,947,107 B2 | 9/2005 | Yoshii et al. |
| 6,953,375 B2 | 10/2005 | Ahn et al. |
| 6,961,167 B2 | 11/2005 | Prins et al. |
| 6,962,419 B2 | 11/2005 | Huibers |
| 6,965,375 B1 | 11/2005 | Gettemy et al. |
| 6,967,698 B2 | 11/2005 | Tanoue et al. |
| 6,969,635 B2 | 11/2005 | Patel et al. |
| 6,970,227 B2 | 11/2005 | Kida et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,042,618 B2 | 5/2006 | Selebrede et al. |
| 7,042,643 B2 | 5/2006 | Miles |
| 7,046,221 B1 | 5/2006 | Malzbender |
| 7,046,905 B1 | 5/2006 | Gardiner et al. |
| 7,050,035 B2 | 5/2006 | Iisaka |
| 7,050,141 B2 | 5/2006 | Yokoue |
| 7,050,219 B2 | 5/2006 | Kimura |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,072,096 B2 | 7/2006 | Holman et al. |
| 7,110,158 B2 | 9/2006 | Miles |
| 7,116,464 B2 | 10/2006 | Osawa |
| 7,123,216 B1 | 10/2006 | Miles |
| 7,123,796 B2 | 10/2006 | Steckl et al. |
| 7,126,738 B2 | 10/2006 | Miles |
| 7,156,548 B2 | 1/2007 | Teng et al. |
| 7,161,094 B2 | 1/2007 | Kothari et al. |
| 7,164,250 B2 | 1/2007 | Boscolo et al. |
| 7,184,202 B2 | 2/2007 | Miles et al. |
| 7,198,982 B2 | 4/2007 | Patel et al. |
| 7,227,677 B2 | 6/2007 | Ravnkilde et al. |
| 7,271,945 B2 | 9/2007 | Hagood et al. |
| 7,274,416 B2 | 9/2007 | Feenstra et al. |
| 7,304,785 B2 | 12/2007 | Hagood et al. |
| 7,304,786 B2 | 12/2007 | Hagood et al. |
| 7,365,897 B2 | 4/2008 | Hagood et al. |
| 7,374,328 B2 | 5/2008 | Kuroda et al. |
| 7,463,227 B2 | 12/2008 | Van et al. |
| 7,551,344 B2 | 6/2009 | Hagood et al. |
| 7,619,806 B2 | 11/2009 | Hagood, IV et al. |
| 7,636,189 B2 | 12/2009 | Hagood, IV et al. |
| 7,746,529 B2 | 6/2010 | Hagood et al. |
| 7,784,954 B1 | 8/2010 | Coleman |
| 7,808,706 B2 | 10/2010 | Fadel et al. |
| 7,852,546 B2 | 12/2010 | Fijol et al. |
| 7,876,489 B2 | 1/2011 | Gandhi et al. |
| 8,248,560 B2 * | 8/2012 | Kim et al. ............... 349/112 |
| 8,441,602 B2 * | 5/2013 | Kim et al. ............... 349/112 |
| 2001/0001260 A1 | 5/2001 | Parker et al. |
| 2001/0028993 A1 | 10/2001 | Sanford |
| 2001/0040538 A1 | 11/2001 | Quanrud |
| 2001/0043208 A1 | 11/2001 | Furness, III |
| 2001/0048265 A1 | 12/2001 | Miller et al. |
| 2001/0053075 A1 | 12/2001 | Parker et al. |
| 2002/0001051 A1 | 1/2002 | Krusius et al. |
| 2002/0009275 A1 | 1/2002 | Williams et al. |
| 2002/0015215 A1 | 2/2002 | Miles |
| 2002/0024641 A1 | 2/2002 | Ilkov et al. |
| 2002/0024711 A1 | 2/2002 | Miles |
| 2002/0047172 A1 | 4/2002 | Reid |
| 2002/0054424 A1 | 5/2002 | Miles |
| 2002/0054487 A1 | 5/2002 | Parker et al. |
| 2002/0054488 A1 | 5/2002 | Ohkawa |
| 2002/0056900 A1 | 5/2002 | Liu et al. |
| 2002/0063661 A1 | 5/2002 | Comiskey et al. |
| 2002/0070931 A1 | 6/2002 | Ishikawa |
| 2002/0075555 A1 | 6/2002 | Miles |
| 2002/0080598 A1 | 6/2002 | Parker et al. |
| 2002/0113281 A1 | 8/2002 | Cunningham et al. |
| 2002/0126364 A1 | 9/2002 | Miles |
| 2002/0126387 A1 | 9/2002 | Ishikawa et al. |
| 2002/0132389 A1 | 9/2002 | Patel et al. |
| 2002/0141174 A1 | 10/2002 | Parker et al. |
| 2002/0149828 A1 | 10/2002 | Miles et al. |
| 2002/0163482 A1 | 11/2002 | Sullivan |
| 2002/0163484 A1 | 11/2002 | Furness, III |
| 2002/0163709 A1 | 11/2002 | Mirza |
| 2002/0171327 A1 | 11/2002 | Miller et al. |
| 2002/0185699 A1 | 12/2002 | Reid |
| 2002/0191267 A1 | 12/2002 | Flanders et al. |

(56) References Cited

U.S. PATENT DOCUMENTS

| | | |
|---|---|---|
| 2002/0196522 A1 | 12/2002 | Little et al. |
| 2003/0007344 A1 | 1/2003 | Parker |
| 2003/0009898 A1 | 1/2003 | Slocum et al. |
| 2003/0023110 A1 | 1/2003 | Tam et al. |
| 2003/0029705 A1 | 2/2003 | Qiu et al. |
| 2003/0036215 A1 | 2/2003 | Reid |
| 2003/0043157 A1 | 3/2003 | Miles |
| 2003/0048036 A1 | 3/2003 | Lemkin |
| 2003/0058543 A1 | 3/2003 | Sheedy et al. |
| 2003/0063233 A1 | 4/2003 | Takagi |
| 2003/0063234 A1 | 4/2003 | Oda et al. |
| 2003/0068118 A1 | 4/2003 | Bourgeois et al. |
| 2003/0072070 A1 | 4/2003 | Miles |
| 2003/0076649 A1 | 4/2003 | Speakman |
| 2003/0081402 A1 | 5/2003 | Jeon et al. |
| 2003/0085650 A1 | 5/2003 | Cathey et al. |
| 2003/0085867 A1 | 5/2003 | Grabert |
| 2003/0095081 A1 | 5/2003 | Furness, III |
| 2003/0095398 A1 | 5/2003 | Parker et al. |
| 2003/0102810 A1 | 6/2003 | Cross et al. |
| 2003/0123245 A1 | 7/2003 | Parker et al. |
| 2003/0123246 A1 | 7/2003 | Parker |
| 2003/0123247 A1 | 7/2003 | Parker et al. |
| 2003/0133284 A1 | 7/2003 | Chipchase et al. |
| 2003/0137499 A1 | 7/2003 | Iisaka |
| 2003/0152872 A1 | 8/2003 | Miles |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190535 A1 | 10/2003 | Fries |
| 2003/0190536 A1 | 10/2003 | Fries |
| 2003/0202338 A1 | 10/2003 | Parker |
| 2003/0231160 A1 | 12/2003 | Yoshihara et al. |
| 2004/0012946 A1 | 1/2004 | Parker et al. |
| 2004/0027636 A1 | 2/2004 | Miles |
| 2004/0051929 A1 | 3/2004 | Sampsell et al. |
| 2004/0058532 A1 | 3/2004 | Miles et al. |
| 2004/0080240 A1 | 4/2004 | Miller et al. |
| 2004/0080484 A1 | 4/2004 | Heines et al. |
| 2004/0080927 A1 | 4/2004 | Parker et al. |
| 2004/0085749 A1 | 5/2004 | Parker et al. |
| 2004/0090144 A1 | 5/2004 | Miller et al. |
| 2004/0095739 A1 | 5/2004 | Parker et al. |
| 2004/0100677 A1 | 5/2004 | Huibers et al. |
| 2004/0114346 A1 | 6/2004 | Parker et al. |
| 2004/0122328 A1 | 6/2004 | Wang et al. |
| 2004/0125346 A1 | 7/2004 | Huibers |
| 2004/0135273 A1 | 7/2004 | Parker et al. |
| 2004/0135951 A1 | 7/2004 | Stumbo et al. |
| 2004/0136204 A1 | 7/2004 | Asao |
| 2004/0145580 A1 | 7/2004 | Perlman |
| 2004/0145854 A1 | 7/2004 | Tamura |
| 2004/0157664 A1 | 8/2004 | Link |
| 2004/0165372 A1 | 8/2004 | Parker |
| 2004/0171206 A1 | 9/2004 | Rodgers |
| 2004/0179146 A1 | 9/2004 | Nilsson |
| 2004/0196215 A1 | 10/2004 | Duthaler et al. |
| 2004/0196646 A1 | 10/2004 | Machi et al. |
| 2004/0207768 A1 | 10/2004 | Liu |
| 2004/0218149 A1 | 11/2004 | Huibers |
| 2004/0218154 A1 | 11/2004 | Huibers |
| 2004/0218292 A1 | 11/2004 | Huibers |
| 2004/0218293 A1 | 11/2004 | Huibers |
| 2004/0223088 A1 | 11/2004 | Huibers |
| 2004/0223240 A1 | 11/2004 | Huibers |
| 2004/0227428 A1 | 11/2004 | Sinclair |
| 2004/0233392 A1 | 11/2004 | Huibers |
| 2004/0240032 A1 | 12/2004 | Miles |
| 2004/0246275 A1 | 12/2004 | Yoshihara et al. |
| 2004/0263502 A1 | 12/2004 | Dallas et al. |
| 2004/0263944 A1 | 12/2004 | Miles et al. |
| 2005/0002082 A1 | 1/2005 | Miles |
| 2005/0002086 A1 | 1/2005 | Starkweather et al. |
| 2005/0007759 A1 | 1/2005 | Parker |
| 2005/0012197 A1 | 1/2005 | Smith et al. |
| 2005/0024849 A1 | 2/2005 | Parker et al. |
| 2005/0059184 A1 | 3/2005 | Sniegowski et al. |
| 2005/0062708 A1 | 3/2005 | Yoshihara et al. |
| 2005/0063037 A1 | 3/2005 | Selebrede et al. |
| 2005/0072032 A1 | 4/2005 | McCollum et al. |
| 2005/0073471 A1 | 4/2005 | Selbrede |
| 2005/0088404 A1 | 4/2005 | Heines et al. |
| 2005/0093465 A1 | 5/2005 | Yonekubo et al. |
| 2005/0094240 A1 | 5/2005 | Huibers et al. |
| 2005/0094418 A1 | 5/2005 | Parker |
| 2005/0104804 A1 | 5/2005 | Feenstra et al. |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123243 A1 | 6/2005 | Steckl et al. |
| 2005/0128370 A1 | 6/2005 | Moon |
| 2005/0134805 A1 | 6/2005 | Conner et al. |
| 2005/0141076 A1 | 6/2005 | Bausenwein et al. |
| 2005/0151940 A1 | 7/2005 | Asao |
| 2005/0157365 A1 | 7/2005 | Ravnkilde et al. |
| 2005/0157376 A1 | 7/2005 | Huibers et al. |
| 2005/0168431 A1 | 8/2005 | Chui |
| 2005/0168789 A1 | 8/2005 | Glent-Madsen |
| 2005/0171408 A1 | 8/2005 | Parker |
| 2005/0179977 A1 | 8/2005 | Chui et al. |
| 2005/0195467 A1 | 9/2005 | Kothari et al. |
| 2005/0195468 A1 | 9/2005 | Sampsell |
| 2005/0206991 A1 | 9/2005 | Chui et al. |
| 2005/0207154 A1 | 9/2005 | Parker |
| 2005/0207178 A1 | 9/2005 | Parker |
| 2005/0212738 A1 | 9/2005 | Gally |
| 2005/0213183 A9 | 9/2005 | Miles |
| 2005/0213322 A1 | 9/2005 | Parker |
| 2005/0213323 A1 | 9/2005 | Parker |
| 2005/0213349 A1 | 9/2005 | Parker |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler |
| 2005/0225732 A1 | 10/2005 | Conner et al. |
| 2005/0225827 A1 | 10/2005 | Kastalsky |
| 2005/0231790 A1 | 10/2005 | Miles |
| 2005/0237596 A1 | 10/2005 | Selbrede |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0245313 A1 | 11/2005 | Yoshino et al. |
| 2005/0247477 A1 | 11/2005 | Kothari et al. |
| 2005/0249966 A1 | 11/2005 | Tung et al. |
| 2005/0253779 A1 | 11/2005 | Feenstra et al. |
| 2005/0254115 A1 | 11/2005 | Palmateer et al. |
| 2005/0258571 A1 | 11/2005 | Dumond et al. |
| 2005/0259198 A1 | 11/2005 | Lubart et al. |
| 2005/0265029 A1 | 12/2005 | Epstein et al. |
| 2005/0275072 A1 | 12/2005 | Haluzak et al. |
| 2005/0281052 A1 | 12/2005 | Teng et al. |
| 2005/0285816 A1 | 12/2005 | Glass |
| 2005/0286113 A1 | 12/2005 | Miles |
| 2005/0286114 A1 | 12/2005 | Miles |
| 2006/0001942 A1 | 1/2006 | Chui et al. |
| 2006/0004928 A1 | 1/2006 | Hess et al. |
| 2006/0028708 A1 | 2/2006 | Miles |
| 2006/0028811 A1 | 2/2006 | Ross et al. |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033975 A1 | 2/2006 | Miles |
| 2006/0044246 A1 | 3/2006 | Mignard |
| 2006/0044298 A1 | 3/2006 | Mignard et al. |
| 2006/0044928 A1 | 3/2006 | Chui et al. |
| 2006/0061559 A1 | 3/2006 | King |
| 2006/0061869 A1 | 3/2006 | Fadel et al. |
| 2006/0066934 A1 | 3/2006 | Selbrede |

(56) References Cited

U.S. PATENT DOCUMENTS

| | | |
|---|---|---|
| 2006/0066937 A1 | 3/2006 | Chui |
| 2006/0077125 A1 | 4/2006 | Floyd |
| 2006/0077153 A1 | 4/2006 | Cummings et al. |
| 2006/0077533 A1 | 4/2006 | Miles et al. |
| 2006/0092490 A1 | 5/2006 | McCollum et al. |
| 2006/0132383 A1 | 6/2006 | Gally et al. |
| 2006/0132404 A1 | 6/2006 | Hayes et al. |
| 2006/0139734 A1 | 6/2006 | Selebrede et al. |
| 2006/0146389 A1 | 7/2006 | Selbrede |
| 2006/0172745 A1 | 8/2006 | Knowles |
| 2006/0187190 A1 | 8/2006 | Hagood et al. |
| 2006/0187191 A1 | 8/2006 | Hagood et al. |
| 2006/0187528 A1 | 8/2006 | Hagood et al. |
| 2006/0238443 A1 | 10/2006 | Derichs |
| 2006/0250325 A1 | 11/2006 | Hagood et al. |
| 2006/0250676 A1 | 11/2006 | Hagood, IV et al. |
| 2006/0256039 A1 | 11/2006 | Hagood et al. |
| 2006/0262060 A1 | 11/2006 | Amundson |
| 2006/0262380 A1 | 11/2006 | Miles |
| 2006/0268386 A1 | 11/2006 | Selbrede et al. |
| 2006/0268568 A1 | 11/2006 | Oku et al. |
| 2006/0270179 A1 | 11/2006 | Yang |
| 2006/0291034 A1 | 12/2006 | Patry et al. |
| 2007/0002156 A1 | 1/2007 | Hagood, IV et al. |
| 2007/0002413 A1 | 1/2007 | Psaltis et al. |
| 2007/0030555 A1 | 2/2007 | Barton et al. |
| 2007/0031097 A1 | 2/2007 | Heikenfeld et al. |
| 2007/0035808 A1 | 2/2007 | Amundson et al. |
| 2007/0040982 A1 | 2/2007 | Nakano et al. |
| 2007/0047051 A1 | 3/2007 | Selbrede et al. |
| 2007/0047887 A1 | 3/2007 | Selbrede |
| 2007/0052660 A1 | 3/2007 | Montbach et al. |
| 2007/0053652 A1 | 3/2007 | Mignard et al. |
| 2007/0086078 A1 | 4/2007 | Hagood et al. |
| 2007/0091011 A1 | 4/2007 | Selbrede |
| 2007/0091038 A1 | 4/2007 | Hagood, IV et al. |
| 2007/0150813 A1 | 6/2007 | Selebrede et al. |
| 2007/0159679 A1 | 7/2007 | Hagood et al. |
| 2007/0172171 A1 | 7/2007 | Van et al. |
| 2007/0195026 A1 | 8/2007 | Hagood et al. |
| 2007/0205969 A1 | 9/2007 | Hagood, IV et al. |
| 2007/0216987 A1 | 9/2007 | Hagood et al. |
| 2007/0223080 A1 | 9/2007 | Hagood, IV et al. |
| 2007/0279727 A1* | 12/2007 | Gandhi et al. ............ 359/242 |
| 2007/0297747 A1 | 12/2007 | Biernath et al. |
| 2008/0037104 A1 | 2/2008 | Hagood et al. |
| 2008/0094853 A1 | 4/2008 | Kim et al. |
| 2008/0129681 A1 | 6/2008 | Hagood et al. |
| 2008/0145527 A1 | 6/2008 | Hagood et al. |
| 2008/0174532 A1 | 7/2008 | Lewis |
| 2008/0283175 A1 | 11/2008 | Hagood et al. |
| 2009/0103164 A1 | 4/2009 | Fijol et al. |
| 2009/0257245 A1 | 10/2009 | Kim et al. |
| 2012/0275184 A1 | 11/2012 | Kim et al. |

FOREIGN PATENT DOCUMENTS

| | | |
|---|---|---|
| EP | 0495273 B1 | 9/1996 |
| EP | 0415625 B1 | 1/1997 |
| EP | 0884525 A2 | 12/1998 |
| EP | 0751340 B1 | 5/2000 |
| EP | 1091342 A2 | 4/2001 |
| EP | 1202096 A2 | 5/2002 |
| EP | 1329664 A1 | 7/2003 |
| EP | 1426190 A1 | 6/2004 |
| EP | 1533853 A2 | 5/2005 |
| EP | 1674893 A1 | 6/2006 |
| EP | 1757958 A1 | 2/2007 |
| FR | 2726135 A1 | 4/1996 |
| JP | 3142409 A | 6/1991 |
| JP | 4249203 A | 9/1992 |
| JP | 9198906 A | 7/1997 |
| JP | 11015393 A | 1/1999 |
| JP | 2002318564 A | 10/2002 |
| JP | 2003162904 A | 6/2003 |
| JP | 2003208810 A | 7/2003 |
| WO | 9401716 A1 | 1/1994 |
| WO | 9804950 A1 | 2/1998 |
| WO | 9855798 A2 | 12/1998 |
| WO | 9901696 A1 | 1/1999 |
| WO | 0050807 A1 | 8/2000 |
| WO | 03008860 A1 | 1/2003 |
| WO | 03050448 A1 | 6/2003 |
| WO | 03061329 A2 | 7/2003 |
| WO | 03081315 A1 | 10/2003 |
| WO | 2004019120 A1 | 3/2004 |
| WO | 2004034136 A1 | 4/2004 |
| WO | 2004086098 A2 | 10/2004 |
| WO | 2005001892 A2 | 1/2005 |
| WO | 2005062908 A2 | 7/2005 |
| WO | 2006017129 A2 | 2/2006 |
| WO | 2006023077 A2 | 3/2006 |
| WO | 2006039315 A2 | 4/2006 |
| WO | 2006052755 A2 | 5/2006 |
| WO | 2006091791 | 8/2006 |
| WO | 2007123173 A1 | 11/2007 |
| WO | 2009128885 | 10/2009 |

OTHER PUBLICATIONS

Alt P.M., et al., "A Gray-Scale Addressing Technique for Thin-Film-Transistor/Liquid Crystal Displays," IBM J. Res. Develop., 36 (1), Jan. 1992, pp. 11-22.

AZ Displays, Inc., "Complete LCD Solutions," ATM3224C-NC-FTH, pp. 1-15 (Oct. 2, 2003).

Bergquist et al., "Field Sequential Colour Display with Adaptive Gamut", Society for Information Display, Digest of Technical Papers, 2006, pp. 1594-1597.

Birch et al, "31.1: SXGA Resolution FLC Microdisplays," SID 02 Digest, 954-957 (2002).

B.J. Feenstra et. al. "A Reflective Display Based on Electrowetting: Principle and Properties", International Display Research Conference Proceedings 2003, p. 322.

Blackstone, "Making MEMS Reliable," SPIE's OEMagazine, 32-34 (Sep. 2002).

"BLU,"Heesung Precision Ltd., http://www.hspr.co.kr/eng/product/blu.asp Retrieved on Aug. 3, 2006.

Boer W.D., "Active Matrix Liquid Crystal Displays", Elsevier Science & Technology Books, ISBN #0750678135, Aug. 2005, Publishers annotation in 2 pages.

Boeuf, J.P., "Plasma display panels: physics,recent deveopments and key issues," J. Phys. D: Appl. Phys. 36 (2003) R53-R79 (received Aug. 29, 2002: published Feb. 26, 2003).

Bozler et al, "Arrays of gated field-emitter cones having 0.32 mm tip-to-tip spacing," J. Vec. Sci. Technol. B, 12 (2): 629-632 (Mar./Apr. 1994).

Bryan-Brown, "Ultra Low Power Bistable LCDs," SID 00, 76-79 (2000).

Chino E. et al., "25.1: Invited Paper: Development of Wide-Color-Gamut Mobile Displays with Four-primary-color LCDs," Society for Information Display, 37 (2), 2006, pp. 1221-1224.

Clark N. A., et al., "FLC Microdisplays", Ferroelectrics, 246, 2000, pp. 97-110.

Davis, "Light Emitting Diode Source Modeling for Optical Design," Reflexite Display Optics (Oct. 2004).

Davis, "Microstructured Optics for LED Applications," Reflexite Display Optics (2002).

Doane, et al, "Display Technologies in Russia, Ukraine, and Belarus," World Technology Evaluation Center Panel Report (Dec. 1994) http://www.wtec.org/loyola/displays/toc.htm, retrieved on Nov. 22, 2005.

Doherty D. et al., "Pulse Width Modulation Control of DLP Projectors", TI Technical Journal, Jul.-Sep. 1998, No. 3, pp. 115-121.

"Electronic Display Lighting Tutorials," 3M Corporation,file //D:/Optical/Vikuiti Tutorial.htm. retrieved on Aug. 10, 2006.

Feenstra J. et al., "Electrowetting Displays", Liquavista BV, http://www.liquavista.com/documents/electrowetting_displays_whitepaper.pdf, Retrieved on Aug. 17, 2006, pp. 1-16.

(56) References Cited

OTHER PUBLICATIONS

Feng, et al, "Novel Integrated Light-Guide Plates for Liquid Crystal Display Backlight," Journal of optics a Pure and applied optics, 2005, 7, 111-117.
Feng, "High Quality Light Guide Plates that Can Control the Illumination Angle Based on Microprism Structures," Applied Physics Letters, 85 (24): 6016-6018 (Dec. 2004).
Final Office Action dated May 18, 2007, U.S. Appl. No. 11/218,690.
Final Office Action dated Oct. 3, 2007 in U.S. Appl. No. 11/218,690.
Final Office Action dated Sep. 21, 2007, U.S. Appl. No. 11/546,937.
Flat Panel Display (FPD) Manufacturing Equipment that Cuts Production Costs by Half, Shibaura Mechatronics Corporation, product brochure for panel processing.
Foley, "NE04-21: Microstructured Plastic Optics for Display, Lighting, and Telecommunications Applications," Fresnel Optics (2001).
Funamoto et al, "Diffusive-sheetless Backlight System for Mobile Phone," IDW/AD, 1277-1280 (2005).
Funamoto et. al. "LED Backlight System with Double-Prism Pattern", Journal of the Society for Information Display v. 14, pp. 1045-1051 (2006).
Goddhue et al, "Bright-field analysis of field-emission cones using high-resolution tranmission electron microscopy and the effect of structural properties on current stability," J. Vac. Sci. Technol. B, 12 (2): 693-696 (Mar.Apr. 1994).
Hartman, "4.1: Invited paper: Two-Terminal Devices Technologies for AMLCDs," SID 95 Digest, 7-10 (1995).
Hewlett et al, "DLP CinemaTM projection: A hybrid frame-rate technique for flicker-free performance," Journ of the SID 9/3, 221-226 (2001).
Hornbeck J. "Digital Light Processing TM: A New MEMS-Based Display Technology," Technical Digest of the IEEJ 14th Sensor Symposium, Jun. 4-5, 1996, pp. 297-304.
International Preliminary Report on Patentability and Written Opinion dated Oct. 28, 2010 in International Application No. PCT/US2009/002288.
International Search Report and Written Opinion dated Jun. 29, 2009 in International Application No. PCT/US2009/000922.
International Search Report and Written Opinion in International Application No. PCT/US2007/021434 dated Feb. 28, 2008.
International Search Report in International Application No. PCT/US2009/002288 dated Jul. 21, 2009.
J. Heikenfeld et. al., "Contrast Enhancement in Black Dielectric Electroluminescent Devices", IEEE Transactions on Electron Devices, 49: 8, 1348-52 (2002).
Jepsen et al, "4.11: 0.9" SXGA Liquid Crystal on Silicon Panel with 450 Hz. Field Rate," SID MicroDisplay Corporation, pp. 106-109 (Sep. 2001).
Johnstone et al, "Theoretical limits on the freestanding length of cantilevers produced by surface micromachining technology," J. Micromech. Microeng. 12: 855-861 (Published Oct. 3, 2002).
Jones et al, "29-1: Addressing TVmin Ferroelectric Liquid Crystal Displays," (1998).
Judy, et al, "Self-Adjusting Microstructures(SAMS)," Proceedings of the Workshop on Micro Electro Mechanical Systems, New York, Jan. 30, 1991, vol. Workshop 4, pp. 51-56.
Judy, M. W., "Micromechanisms Using Sidewall Beams," Dissertation, University of California at Berkeley, 1994.
Kalantar et al, "Optical Micro Deflector Based Functional Light-Guide Plate for Backlight Unit," SID 00 Digest, 1029-1031 (2000).
Kalantar, K., et al., "Backlight Unit with Double Surface Light Emission Using a Single Micro-structured Light-guide Plate," p. 1182, Society for Information Display Digest (2004).
Kalantar, "Modulation of viewing angle on an LCD surface through backlight optics," Journal of the SID, 11 (4): 647-652 (2003).
Koden et al., "Ferroelectric Liquid Crystal Display," (Sep. 17, 1997).
Kuang et al., "Dynamic characteristics of shaped micro-actuators solved using the differential quadrature method," Journal of Micromechanics and Microengineering, 14: 647-655, (2004).
Kunzman A. et al., "10.3 White Enhancement for Color Sequential DLP", Society for Information Display, Digest of Technical Papers, 1998.
Lee, et al., "40.1: Distingusihed Contributed Paper: Integrated Amorphous Silicon Color Sensor on LCD Panel for LED Backlight Feedback Control System", Society for Information Display, Digest of Technical Papers, 2005, pp. 1376-1379.
Lee et al, "P-25: A LCOS Microdisplay Driver with Frame Buffering Pixels," SID 02 Digest, 292-295 (2002).
Legtenberg, et al., "Electrostatic Curved Electrode Actuators," Journal of Microelectromechanical Systems, 6 (3): 257-265 (Sep. 1997).
Li, J., et al., "DRIE-Fabricated Curved-Electrode Zipping Actuators with Low Pull-In Voltage," 12th International Conference on Solid State Sensors, Actuators and Microsystems, IEE, 480-483 (2003).
Liang et al, "Observation of electric field gradients near field-emission cathode arrays," Appl Phys. Lett., 66 (9): 1147-1149 (Feb. 27, 1995).
Liu et al, "Scaling Laws of Microactuators and Potential Applications of Electroactive Polymers in MEMS," SPIE, 3669: 345-354 (Mar. 1999).
"Low Temperature Polysilicon TFT Reflective Color LCD" by Techno World.
Maboudian et al., "Stiction reduction processes for surface micromachines," Tribology Letters, 3: 215-221 (1997).
Mastrangelo et al, "Mechanical Stability and Adhesion of Microstructures Under Capillary Forces—Part I: Basic Theory," Journal of Microelectromechanical Systems, 2 (1): 33-43 (Mar. 1993).
Mastrangelo et al, "Mechanical Stability and Adhesion of Microstructures Under Capillary Forces—Part II: Experiments," Journal of Microelectromechanical Systems, 2 (1): 44-55 (Mar. 1993).
McLaughlin, "Progress in Projection and Large-Area Displays," Proceedings of the IEEE, 90 (4): 521-532 (Apr. 2002).
"MicroLensTm—Re-Inventing LCD Backlighting," Global Lighting Technologies Inc., http://www.glthome.com/tech.htm, 1-2; retrieved on Aug. 3, 2006.
"Microprism Technology for Luminaires," Reflexite Display Optics, Pub. 2003, Rev. 2.
"Nano TM Su-8 2000 Negative Tone Photoresist Formulations 2002-2025," Micro Che, Rev. 2/02m.
Non Final Office Action Dated Mar. 22, 2007, U.S. Appl. No. 11/546,937.
Non Final Office Action dated Nov. 1, 2006, U.S. Appl. No. 11/218,690.
Notice of Allowance dated Apr. 23, 2012 in U.S. Appl. No. 12/258,206.
Okumura et al, "Highly-efficient backlight for liquid crystal display having no optical films," Applied Physics Letters, 83 (13): 2515-2517 (Sep. 29, 2003).
"Optical Design Tools for Backlight Displays," Light Tools, Optical Research Associates 1-8.
Pasricha S. et al., "Dynamic Backlight Adaptation for Low Power Handheld Devices" IEEE Design and Test v. 21, 2004, pp. 398.
Perregaux, G., et al, "Arrays of Addressable High-Speed Optical Microshutters," CSEM Swiss Center for Electronics and Microtechnology Inc., Microsystems Division, pp. 232-235 (2001).
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378DOHGJgl/theme_us_vikuiti_3_0/command_AbcPageHandler/output_html Retrieved on Aug. 3, 2006.
"Prism Sheet," Mitsubishi Rayon America Inc., http://www.mrany.com/data/HTML/29.htm Retrieved on Aug. 4, 2006.
Qiu et al, "A Curved-Beam Bistable Mechanism," Journal of Microelectromechanical Systems, 13 (2): 137-145 (Apr. 2004).
Qiu et al, "A High-Current Electrothermal Bistable MEMS Relay," Micro Electro Mechanical Systems, MEMS-03 Kyoto, pp. 64-67 (Jan. 19-23, 2003).
Ravnkilde J., et al., "Fabrication of Nickel Microshutter Arrays for Spatial Light Modulation", Mesomechanics, 2002, pp. 161-165. Also

(56) References Cited

OTHER PUBLICATIONS on their web site: http://www2.mic.dtu.dk/research/mems/publications/Papers/Dicon_Meso2002.pdf.
Roosendaal et al, "25.2: A Wide Gamut, High Aperture Mobile Spectrum Sequential Liquid Crystal Display," SID 05 Digest, 1116-1119 (2005).
Saeedi, et. al. "Molten-Alloy Driven Self-Assembly for Nano and Micro Scale System Integration" Fluid Dynamics and Materials Processing, vol. 2, No. 4, pp. 221-245 (2006).
Sato, "Research on Flexible Display Systems," Broadcast Technology, 21: 10-15 (Winter, 2005).
Sharp Specification No. LCP—03015 for Mobile Liquid Crystal Display Group, Sharp Corporation, Jun. 13, 2003.
Shikida et al, "Fabrication of an S-shaped Microactuator," Journal of Microelectromechanical Systems, 6 (1): 18-24 (Mar. 1997).
Sony Corporation, "ACX705AKM, 6.92cm Diagonal Reflective Color LCD Module".
Steyn, Lodewyck, "Electroquasistatic Zipper Actuators: A Technology Review", Dec. 2004.
Tagaya et al., "Thin Liquid-Crystal Display Backlight System with Highly Scattering Optical Transmission Polymers," Applied Optics, 40 (34): 6274-6280 (Dec. 2001).
Takatori, et al., "6.3: Field-Sequential Smectic LCD with TFT Pixel Amplifier," SID 01, 2001, Digest, pp. 48-51.
Tan et al "Soldering Technology for Optoelectronics Packaging", 1996 Electronic Components and Technology Conference, pp. 26-36 (1996).
Teijido, J.M., "Conception and Design of Illumination Light Pipes," Thesis No. 1498 for University of Neuchatel, http://www.unige.ch/cyberdocuments/unine/theses2000/TeijidoJM/these_front.htm 1: 1-99 Retrieved on Aug. 3, 2006.
Tien et al, "MEMS Actuators for Silicon Micro-Optical Elements," Proc. of SPIE, 4178: 256-269, (2000).
"Two Proprietary Technologies Supporting OMRON Backlight," OMRON Electronics Corporation, OMRON Electronics Components Web, www.omron.co.jp/ecb/products/bklight/english/genri/index.html, retrieved on Aug. 3, 2006.
Underwood, "A review of microdisplay technologies," SID © EID, (Nov. 21-23, 2000).
Underwood, "LCoS through the looking glass," SID (2001).
van de Biggelaar, et. al. "Passive and Active Matrix Addressed Polymer Light-emitting Diode Displays", Proc. SPIE vol. 4295, p. 134 (2001).
Vangbo et al, "A lateral symmetrically bistable buckled beam," J. Micromech. Microeng., 8: 29-32 (1998).
Wang K., et al., "Highly Space-Efficient Electrostatic Zigzag Transmissive Micro-Optic Switches for an Integrated MEMS Optical Display System", Transducers 03 Conference, Jun. 8-12, 2003, vol. 1, pp. 575-575.
Yamada et al, "52.2: Invited Paper: Color Sequential LCD Based on OCB with an LED Backlight," SID 00 Digest, 1180-1183 (2000).
Yasumura et al, "Fluid Damping of an Electrostatic Actuator for Optical Switching Applications," Transducers Research Foundation (2002).
U.S. Office Action dated Jul. 14, 2011, in U.S. Appl. No. 12/258,206.
U.S. Final Office Action dated Feb. 14, 2012, in U.S. Appl. No. 12/258,206.
U.S. Notice of Allowance dated Apr. 23, 2012, in U.S. Appl. No. 12/258,206.
U.S. Office Action dated Sep. 6, 2012, in U.S. Appl. No. 13/542,976.
U.S. Notice of Allowance dated Jan. 16, 2013, in U.S. Appl. No. 13/542,976.

* cited by examiner

LIGHT GUIDES AND BACKLIGHT SYSTEMS INCORPORATING PRISMATIC STRUCTURES AND LIGHT REDIRECTORS

CROSS REFERENCE TO RELATED APPLICATIONS

This application is a continuation of U.S. patent application Ser. No. 13/542,976, filed on Jul. 6, 2012 which is a continuation of U.S. patent application Ser. No. 12/258,206, filed on Oct. 24, 2008, which claims priority to U.S. Provisional Patent Application No. 61/124,168, filed on Apr. 14, 2008. The entire contents of the above applications are incorporated herein by reference.

FIELD OF THE INVENTION

The present invention generally relates to the field of displays, such as imaging and projection displays. In particular, the invention relates to the coordinated design and use of prismatic optical structures, diffusers and/or light redirectors in maximizing the utilization of light in such devices.

BACKGROUND OF THE INVENTION

The displays of many portable devices rely on backlights to provide their illumination. Viewers of these displays desire uniform light emission across the surface of a display with as few visual artifacts as possible. As screens become larger, multiple spatially separated light sources are used to illuminate the backlight. Such illumination schemes increase the challenge of providing artifact free, uniform light emission from a display. There is a need in the art for a display backlight that provide improved light emission, efficient energy usage, color uniformity, and limited visual artifacts, particularly when multiple, spatially separated light sources are employed to illuminate the backlight.

SUMMARY OF THE INVENTION

In general, the present invention pertains to the coordinated use of light redirectors, transparent prismatic structures, and diffuser sheets to smooth out variations in the emitted light profile of light guides used with modulated displays, without substantially broadening the cone of emitted light beyond a desired range of angles in order to accomplish significant increases in luminance for the user. These goals are met by the unique and novel use and arrangement of these elements as described below. The present invention may be implemented in many forms including a device, method, or part of a device.

U.S. Pat. No. 7,417,782 to Hagood et al., the entirety of which is incorporated herein by reference, discloses a structure for improving the optical efficiency of a display including an array of apertures by forming such apertures or light transmissive regions as part of an otherwise reflective surface (referred to as a "reflective aperture layer"). This reflective aperture layer, when coupled with a backlight that includes a second reflective surface, forms an optical cavity that allows for the recycling of light rays that do not immediately pass through the apertures. Displays with optical throughput of efficiencies in the range of 40% to 60% were described even though apertures formed in the reflective layer had area ratios as low as 8% to 20%.

In co-pending U.S. patent application Ser. No. 11/528,191 to Gandhi et al, the entirety of which is incorporated herein by reference, improvements to the optical throughput and to the angular ranges of emitted light for displays were described by means of improved light guides.

In one aspect, the invention relates to a display including an array of light modulators, a light guide, front-facing and rear-facing reflective layers, transparent prismatic structures and diffuser sheets. The light guide comprises surfaces (front, sides, rear) as well as a plurality of light redirectors, also referred to herein as deflectors. In one embodiment, the light guide includes a first light introduction location on a side of the light guide, through which one or more light sources introduce light into the light guide.

The light redirectors within the light guide may have triangular, trapezoidal, trapezial, cylindrical, rounded, elliptical or other defined geometric cross section. In one implementation, at least some of the light redirectors have dimensions that are smaller than 500 microns. The light redirectors are distributed amongst three regions of either the front or rear surfaces of the light guide. A first region includes light redirectors predominantly, if not solely, from a first group of light redirectors. The second region includes light redirectors predominantly, if not solely from a second group of light redirectors. The third region includes light redirectors from both groups.

Light redirectors in the first group substantially face the first light introduction position. That is, a front face of a light redirector in the first group is substantially perpendicular (e.g., within plus or minus 20 degrees of perpendicular) to a line connecting the light redirector, for example from the center of its front face, to the first light introduction position. Light redirectors in the second group similarly substantially face the second light introduction position. The light redirectors in each group may vary in size, shape, and angle relative to the line connecting the light redirector to its corresponding light introduction position. The light redirectors may increase in height with distance from the corresponding light introduction position. Located between the light guide and the modulated portion of the display, various combinations of prismatic transparent structures are used to adjust and maintain the cone angle of the light.

In another aspect, the invention relates to the placement and orientation of transparent prismatic structures placed between the light guide and the modulator plate. In one embodiment, the placement of these transparent prismatic structures is both in rear-facing (towards the light guide) and front-facing (towards the modulator) orientations. The combination of diverge/converge action of the structures on the cone angle of the light passing through the structures increases the efficiency of the light distribution. In another embodiment, these prismatic transparent structures are formed into sheets, and similarly positioned with comparable results. In one embodiment the rear-facing plurality of prisms are placed between the front-facing plurality of prisms and the front surface of the light guide.

In another aspect, the invention relates to the addition of one or more diffusers of varying transparency at critical positions in the light path, strategically placed between the light guide and the modulator portion of the display. Such diffusers vary the luminance of the display in a desirable fashion.

In one embodiment, such a diffuser is located between the rear-facing and the front-facing prismatic structures. In another embodiment, such a diffuser is located between the light guide and the rear-facing prism sheet. In another embodiment, a diffuser is placed between the front-facing prismatic structure and the modulator portion of the display.

In another aspect, the front-facing and rear-facing reflective layers are intended to recycle light not presented to the user, that is, light that does not go through an open modulator aperture. The front-facing light reflective layer is placed at the bottom of the light guide. The rear-facing reflective layer is preferably positioned behind the light modulators.

In one embodiment, the rear-facing reflective layer is formed from the deposition of a metal on the front surface of the light guide. The rear-facing reflective layer may also be formed from a dielectric mirror or from a thin film stack that includes both dielectric and metal layers. The rear-facing reflective layer preferably reflects light specularly with a reflectivity in the range of between about 80% and about 98%. According to one feature, the rear-facing reflective layer is preferably positioned proximate to the array of light modulators. In one embodiment the rear-facing reflective layer positioned within 0.5 mm of the array of light modulators. In another embodiment, an array of light modulators is formed on a substrate, and the distance between the rear-facing reflective layer and the array of light modulators is less than the thickness of the substrate.

In another aspect, the invention relates to a method for forming an image using an improved optical cavity. According to one embodiment, the method includes providing an array of light modulators, which defines a display surface, in proximity to an illumination system including a front-facing prism sheet, a rear-facing prism sheet and a light guide positioned behind said rear-facing prism sheet. The light guide has front and rear surfaces and a plurality of geometric light redirectors formed therein. Light from the light sources is reflected off the geometric light redirectors towards the front of the display apparatus within a useful range of angles about a display axis perpendicular to the display surface. The redirected light passes through both front and rear-facing prism sheets maintaining the redirected light within the same useful range of angles about the display axis.

In other embodiments, a light diffuser is located between the light guide and the rear-facing prisms sheet in order to diffuse the light passed through it. In other embodiments, a diffuser is sandwiched between the rear-facing and front-facing prism sheets, diffusing light passed through it. In another embodiment, the rear-facing plurality of prisms are located between the front-facing plurality of prisms and the front surface of the light guide. In one embodiment, the light is reflected such that the intensity of the redirected light within the useful range of angles about the display axis is at least 50% of the initial total light intensity.

In one embodiment, the light modulators are MEMS-based light modulators, for example, shutters, which selectively interfere with light that passes through corresponding apertures in the rear-facing reflective layer. In another embodiment the shutters are liquid-based shutters, which can selectively interfere with light using a mechanism referred to as electro-wetting. In another embodiment, the light modulators are liquid crystal cells. The array of light modulators defines a display surface. The display plane is preferably substantially planar.

Other objects, features and advantages of the present invention will become apparent upon examining the following detailed description of an embodiment thereof, taken in conjunction with the attached drawings.

BRIEF DESCRIPTION OF THE DRAWINGS

The foregoing discussion will be understood more readily from the following detailed description of the invention with reference to the following drawings.

DESCRIPTION OF CERTAIN ILLUSTRATIVE EMBODIMENTS

To provide an overall understanding of the invention, certain illustrative embodiments will now be described, including backlights and backlight systems for providing illumination for a display. However, it will be understood by one of ordinary skill in the art that the backlights and backlight systems described herein may be adapted and modified as is appropriate for the application being addressed and that the systems and methods described herein may be employed in other suitable applications, and that such other additions and modifications will not depart from the scope hereof.

Figure 1:
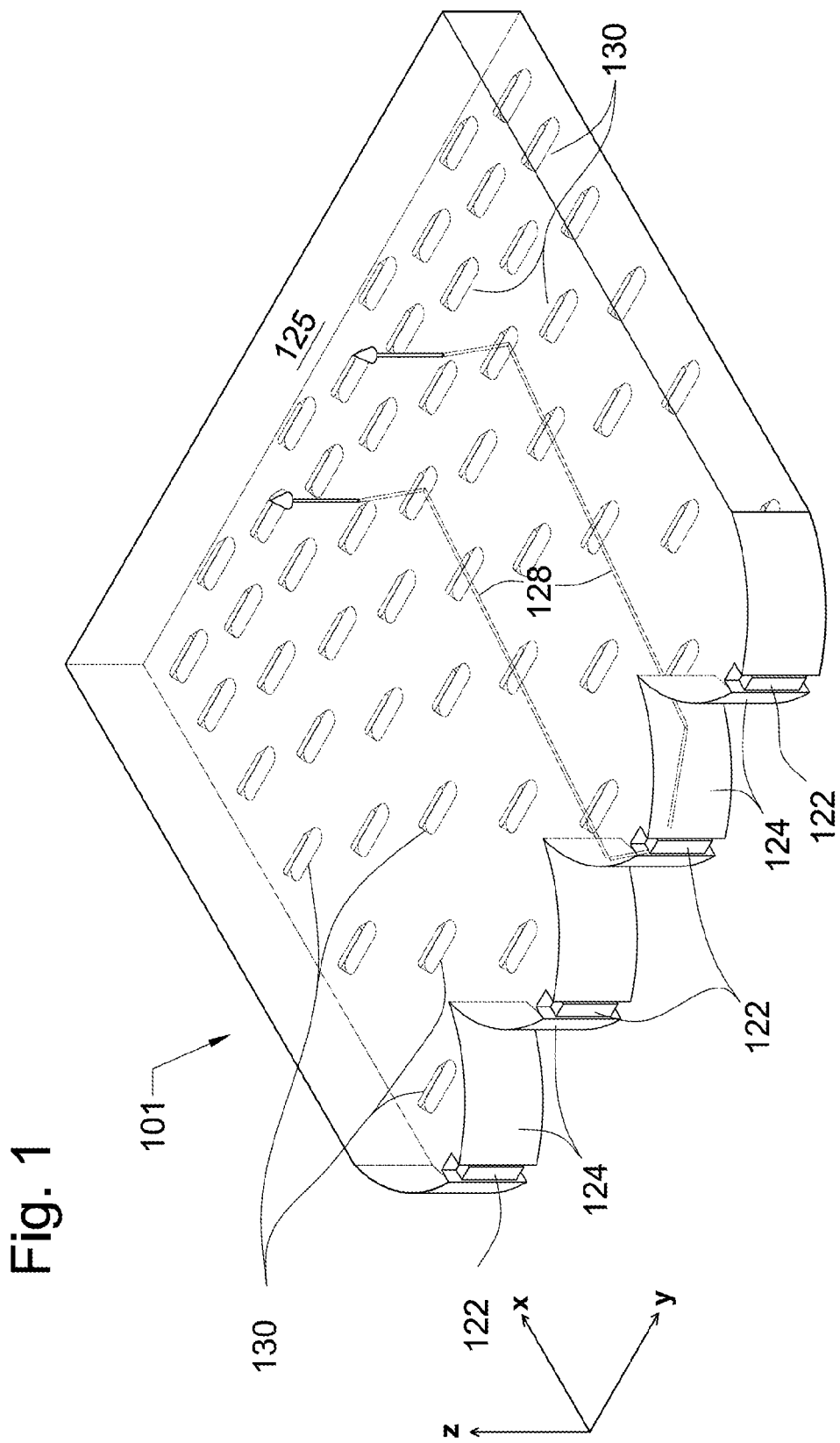
FIG. 1 is a perspective view of a first backlight system, according to an illustrative embodiment of the invention.

FIG. 1 illustrates a backlight system 101 that is useful in conjunction with a number of optical illumination devices, including liquid crystal displays (LCD) or mechanical light modulator displays, including shutter-based, roller actuator, and electrowetting light modulating devices. The backlight system 101 includes a light guide plate 125, made of a transparent material that accepts light from one or more lamps 122, disposed along one edge of the light guide plate. The backlight system 101 is capable of redirecting light vertically, or in a direction normal to the plane of the light guide plate 125 (i.e. along the z-axis) and toward a spatial light modulator and/or toward a viewer of the optical device. The spatial light modulator (not shown) can include an array of light modulators or pixels for forming an image from the light emanating out of the backlight system 101.

In addition to the lamps 122, the backlight system 101 includes collimator structures 124. Light rays, such as light rays 128, exiting the lamps 122, are reflected from the sides of the collimators 124 and then enter the light guide 125 substantially collimated with respect to the x-axis. The divergence of the ray's exiting the curved reflectors can be controlled within +/−50 degrees and in some cases into a divergence as narrow as +/−20 degrees.

The light guide 125 includes an array of geometric light redirectors, also referred to as deflectors 130, formed on the bottom surface of light guide 125. The deflectors serve to re-direct light out of its trajectory in the x-y plane and into directions more closely aligned with the normal or z-axis of the backlight. In some cases, where the deflectors 130 are coated with a metal film, the deflectors 130 re-direct light by means of reflection from the metal surface. In light guide 125, however, the deflectors are formed from indentations or protuberances in the molded bottom surface of light guide 125.

The light reflections occur by means of partial or total internal reflection at the interface between the plastic light guide 125 and the outside air.

The deflectors 130 are 3-dimensional shapes formed from the indentations in or protuberances from the surface of light guide plate 125. The cross section through the narrow dimension of the deflector 130 is a trapezoid, i.e. each deflector has a flat top that is substantially parallel to the surface of light guide plate 125. The cross section of deflector 130 along the longer axis is also a trapezoid.

All of the deflectors 130 are arranged with their long axes parallel to the y-axis. Each deflector has a front face whose normal lies in the x-z plane. The angle of the front face with respect to the x-axis is chosen to maximize the amount of light, as exemplified by rays 128 that can be extracted from the light guide plate and directed substantially along the z-axis or toward the viewer. The deflector 130 has an aspect ratio in length to width greater than 2:1, in some cases greater than 20:1.

The deflectors 130 are arranged with unequal spacing in the light guide 105. The closer spacing (or higher density of deflectors 130) at distances further from the lamps 122 helps to improve the uniformity of the luminous intensity of the light emitted out of the top surface of the light guide. Although FIG. 1 shows the deflectors arranged in rows with more or less regular spacing between deflectors in a row, it is often advantageous to randomize the position or vary the spacing between deflectors 130 in a local area, in order to avoid illumination artifacts in the display. In some embodiments the size and shape of the deflectors 130 is varied as a function of position in the light guide plate 125. In other embodiments a variety of orientation angles is provided for the geometric light redirectors 130. For instance, while on average the deflectors 130 will have the surface normal of their front face lying in the x-z plane, a plurality of deflectors 130 could also be tilted so that their surface normal are directed slightly to the right or to the left of the x-z plane.

While the deflectors 130 in backlight system 101 are formed in the rear surface of light guide 125, other embodiments are possible where the deflectors can be formed in the top surface of the light guide. Alternate shapes for the geometric light redirectors 130 are known in the art including, without limitation, triangular prism structures, hexagonal prism structures, rhombohedral prism structures, curved or domed shapes, including cylindrical structures, as well as triangular prisms that include rounded corners or edges. For each of these alternate shapes a front face can be identified on the geometric light redirector which possesses a particular orientation with respect to the lamps 122. As opposed to the use of paint dots, which are used in some backlight designs to scatter light into random directions, the front face of a geometric light redirector is designed to scatter light from a lamp into a particular set of directions.

Figure 2:
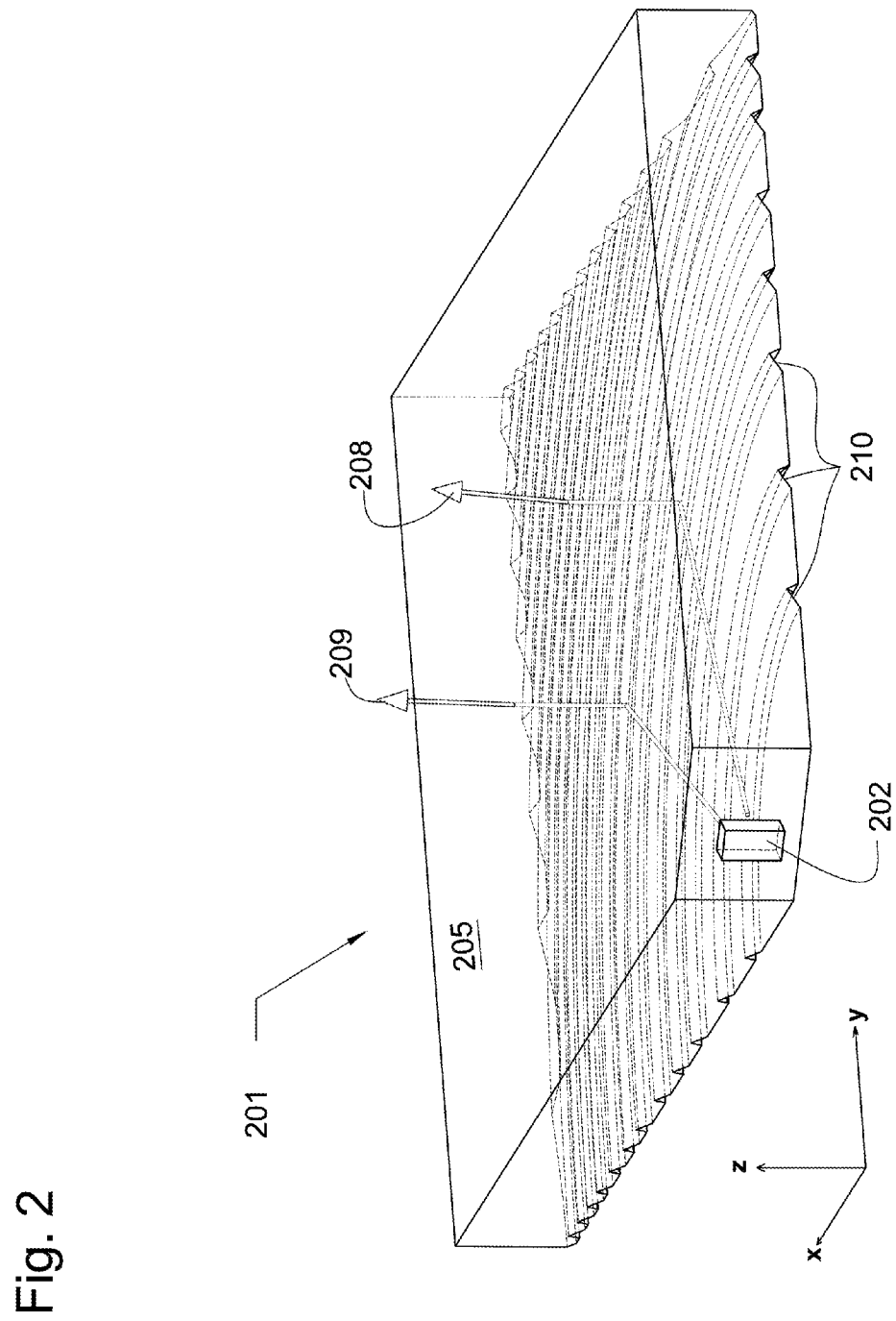
FIG. 2 is a perspective view of a second backlight system, according to an illustrative embodiment of the invention.

The backlight system 201 of FIG. 2 is another example of a backlight for distributing light from a lamp uniformly throughout a planar light guide and re-directing such light toward a viewer. The backlight system 201 includes a plurality of lamps 202, and a light guide plate 205. The light guide 205 includes an array of deflectors 210. The deflectors 210 are long and curved indentations in or protuberances from the bottom surface of light guide plate 205. In cross section, the deflectors 210 are triangular in shape. Optionally, the bottom surface of the light guide plate 205 is coated with or positioned proximate to a reflective metal surface. The deflectors 210 are arranged along the bottom of light guide plate 205 along a series of concentric circles. Light rays such as light rays 208 and 209 exit the lamp 202 in a radial direction within the x-y plane, generally perpendicular to the orientation of the deflector circles 210. After reflection from deflectors 210 the light rays 208 and 209 are re-directed into angles that are closer to the normal or z-axis, i.e. out of the light guide 205, and towards the viewer. The density of placement of deflectors 210, or the spacing between concentric rings, is also varied as a function of distance from the lamp 202 in order to improve the uniformity of the emitted light.

The backlight system 201 is capable of controlling the divergence of light emitted from the top surface of the backlight system 201 to a cone angle of +/−50 degrees, in some cases as narrow as +/−20 degrees. The control of angles is achieved by substantially matching the arrangement of the deflectors 210 to the radiation pattern of the lamps 202. The long axes of deflectors 210 are oriented perpendicular to the rays (or radial vectors) that emanate from the lamps 202. Expressed another way: the normal to the deflecting surfaces from deflectors 210 are contained within a plane that includes the z axis and the radial vectors from lamps 202. Expressed in still another way, the deflecting surfaces of the deflectors 210 intersect the bottom surface of the light guide 205 at lines referred to herein as the "intersection lines." The intersection lines are oriented perpendicular to lines that emanate radially from lamp 202.

Figure 3:
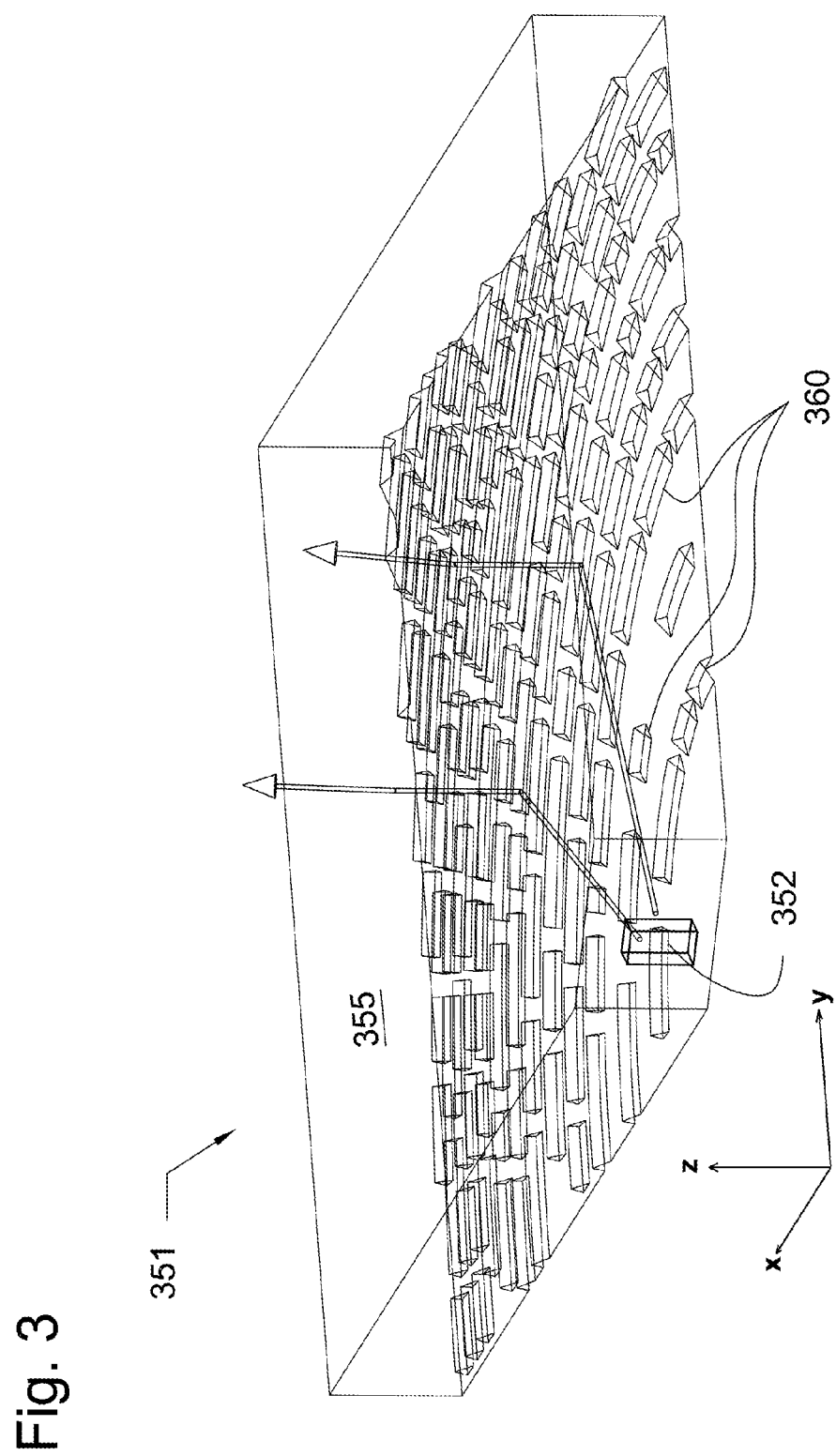
FIG. 3 is a perspective view of a third backlight system, according to an illustrative embodiment of the invention.

The backlight system 351 of FIG. 3 is another example of a backlight for distributing light from a lamp in a substantially uniform fashion throughout a planar light guide and re-directing such light toward a viewer. The backlight system 351 includes lamps 352, a light guide plate 355 and an array of deflectors 360. Optionally, the bottom surface of the light guide plate 355 is coated with or positioned proximate to a reflective metal surface. The deflectors 360 have prismatic shapes similar to deflectors 130, except that the deflectors 360 have a triangular cross section. The segmented or 3-dimensional deflectors 360 are placed along and oriented generally parallel to the circumference of series of circles. The segmented deflectors do not need to be perfectly parallel to the circumferential direction; instead they can have a randomized placement about an average orientation along the circumferential direction. The density of the deflectors 360 varies as a function of distance from the lamps 352. The closer spacing between deflectors 360 at distances further from the lamps 352 helps to ensure the uniformity of the emitted light.

Figure 4:
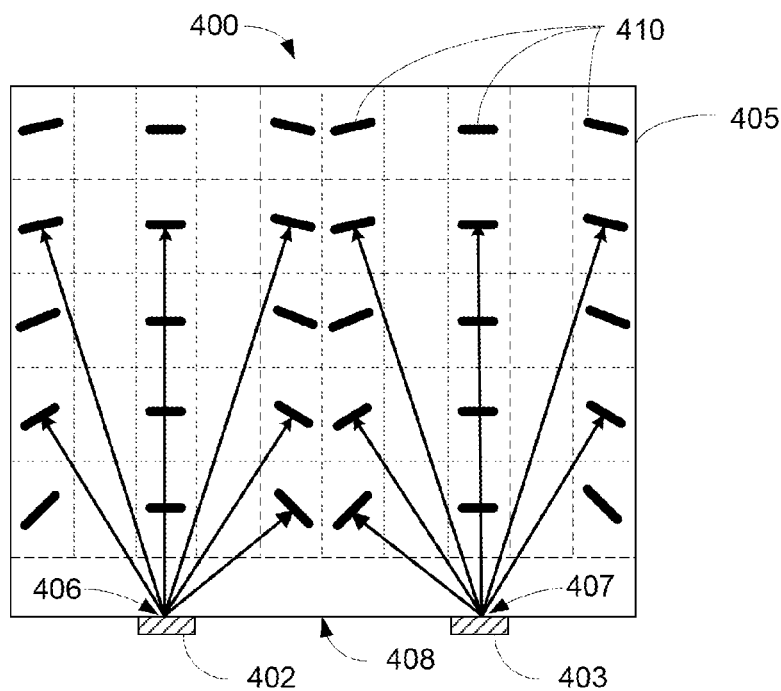
FIG. 4 is a top view of a fourth backlight system, according to an illustrative embodiment of the invention.

The backlight system 400 of FIG. 4 is another example of a backlight in which 3-dimensional control of emitted light is established by incorporation of light redirectors arranged in a radial pattern. The backlight system 400 includes two lamps 402 and 403, a light guide plate 405, and a plurality of deflectors 410. Optionally, the bottom surface of the light guide plate 405 is coated with or positioned proximate to a reflective metal surface. The 3-dimensional shape of deflectors 410 is not shown in FIG. 4, but they are understood to possess either a trapezoidal cross section, as in deflectors 130, or a triangular cross section as in deflectors 360, or any of the cross sections for deflectors described within U.S. patent application Ser. No. 11/528,191, whose specification is incorporated by reference herein in its entirety, including, for example, rounded, cylindrical, trapezial, or other regular geometric shapes. Parker et al (U.S. Pat. No. 6,752,505) discusses similar structures, and is incorporated by reference herein in its entirety. The long axis of each deflector 410 need not be straight, as shown in FIG. 4, but can also be curved, for instance to match the circumference of a circle centered on one of the lamps 402 or 403.

Each of the deflectors 410 possess a front face at least partially directed toward one of two positions (referred to as a "light introduction position") 406 and 407 on the edge 408 of the light guide plate 405 through which one of the lamps 402 or 403 introduces light into light guide plate 405. The normal to the front face of a deflector 410 lies in a plane that contains both the normal to the top surface of the light guide and a line substantially connecting the center of the front face of the deflector to one of the light introduction positions 406 or 407. Similarly, the front faces of the deflectors 410 intersect the bottom surface of the light guide at a line referred to herein as the "intersection line". Each deflector 410 is oriented such that its intersection line is substantially perpendicular to a line connecting the midpoint of the intersection line to a corresponding light introduction position 406 or 407. The deflectors 410 possess both a long axis and a short axis. The long axis is oriented in a direction substantially parallel to the intersection line. In other words, similar to backlight system 351, the deflectors are generally arranged along the circumference of circles which are centered on one or the other of the lamps 402 and 403.

Two groups or distinct populations of deflectors 410, A and B, can be identified within the backlight system 400. One population of deflectors, A—on the left side of backlight 400, is oriented so that their front faces are at least partially directed toward the lamp 402 and the corresponding light introduction position 406 on the edge 408 of the light guide plate 405. The other population of deflectors, B—on the right side of backlight 400, is oriented so that their front faces are at least partially directed toward the lamp 403 and the corresponding light introduction position 407 on the edge 408 of the light guide plate 405.

Both populations of deflectors, A and B, include deflectors 410 with differences in size, shape, orientation, and/or spacing. In some cases the variations within a population are systematic by design. For instance in some embodiments the deflectors 410 are intentionally made taller or wider as the distance increases between the deflectors 410 and the lamp 402 or 403 toward which they are directed. In other embodiments the density of deflectors 410 is increased (i.e., the spacing between deflectors is decreased) as the distance increases between the deflectors 410 and the lamp 402 or 403 toward which they are directed.

In other cases an irregular or random variation in deflector 410 shape or orientation is provided within each of the deflector 410 populations A and B. For instance the faces of the deflectors 410 in population A may be distributed within a range of angles, with respect to lamp 402 and light introduction position 406 where only a median face angle is directed substantially toward the lamp 402 and light introduction position 406. The deflectors 410 within population A have a distribution of face angles that are somewhat greater than or less than the median angle, for instance within a range that is plus or minus 10 degrees or plus or minus 20 degrees. The positions of the deflectors 410 can also be randomized, within the constraints of a given local average deflector 410 density, so as to avoid any fixed or repetitive patterns which might detract from the image quality of the display.

Figure 5:
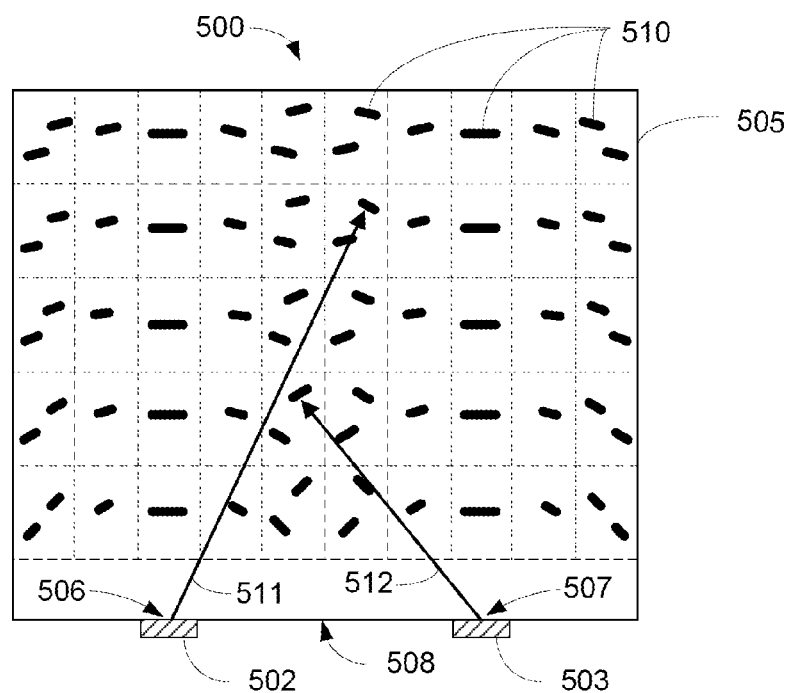
FIG. 5 is a top view of a fifth backlight system, according to an illustrative embodiment of the invention.

The backlight system 500 of FIG. 5 is another example of a backlight in which 3-dimensional control of emitted light is established by incorporation of light redirectors arranged in radial patterns. The backlight system 500 includes two lamps 502 and 503, a light guide plate 505, and a plurality of deflectors 510. Optionally, the bottom surface of the light guide plate 505 is coated with or positioned proximate to a reflective metal surface. The deflectors 510 may have trapezoidal cross sections, triangular cross sections, or any of the deflector cross sections described above.

Each of the deflectors 510 possess a front face substantially directed toward one of two positions (referred to as a "light introduction position") 506 and 507 on the edge 508 of the light guide plate 505 through which one of the lamps 502 or 503 introduces light into light guide plate 505. The normal to the front face of a deflector 510 lies in a plane that contains both the normal to the top surface of the light guide plate 505 and a line substantially connecting the center of the front face of the deflector to one of the lamps 502 or 503 or its corresponding light introduction position 506 or 507 on the edge of the light guide plate 505. The deflectors 510 possess both a long axis and a short axis. The deflectors are arranged such that the long axis is substantially perpendicular to a ray of light emanating from one of either lamp 502 or 503, entering the light guide plate at one of the light introduction positions 506 or 507, and impinging on the reflector at about the midpoint of its long axis. Similar to backlight system 351, the deflectors are generally arranged along the circumference of circles which are centered on one or the other of the lamps 502 and 503.

Two groups or distinct populations of deflectors 510, A and B, can be identified within the backlight system 500. One population, A, of deflectors is oriented so that their front faces are directed substantially toward the lamp 502 and the corresponding light introduction position 506 on the edge of the light guide plate 505. For example, the deflector shown at the terminus of light ray 511 belongs to population A. The other population of deflectors 510, B, is oriented so that their front faces are directed substantially toward the lamp 503 and the corresponding light introduction position 507. For example, the deflector shown at the terminus of light ray 512 belongs to population B. By contrast to backlight 400, however, the deflector populations A and B in backlight 500 are not strictly grouped or segregated by location into one of either the left side or right side of the backlight. Instead the populations A and B are intermixed. Many, but not all of the deflectors 510 in population A are located on the side of the backlight nearest to the light introduction position 506. Many, but not all of population B are located on the side of the backlight nearest to the light introduction position 507. In the central region of the backlight referred to as a mingling region, deflectors can be found oriented toward either of the lamps 502 or 503 and their corresponding light introduction positions 506 and 507. That is, the mingling region includes deflectors 510 from each of the populations A and B.

The populations of deflectors 510, A and B, can include deflectors 510 having differences in size, shape, orientation, or spacing. As described above, some of these variations can be systematic, as when the size of a deflector 510 varies as a function of its position relative to an associated lamp or light introduction position. Alternatively, the variations can be irregular, as when the face angles or the density of deflectors 510 in a population is allowed to be distributed about some mean value.

Figure 6A:
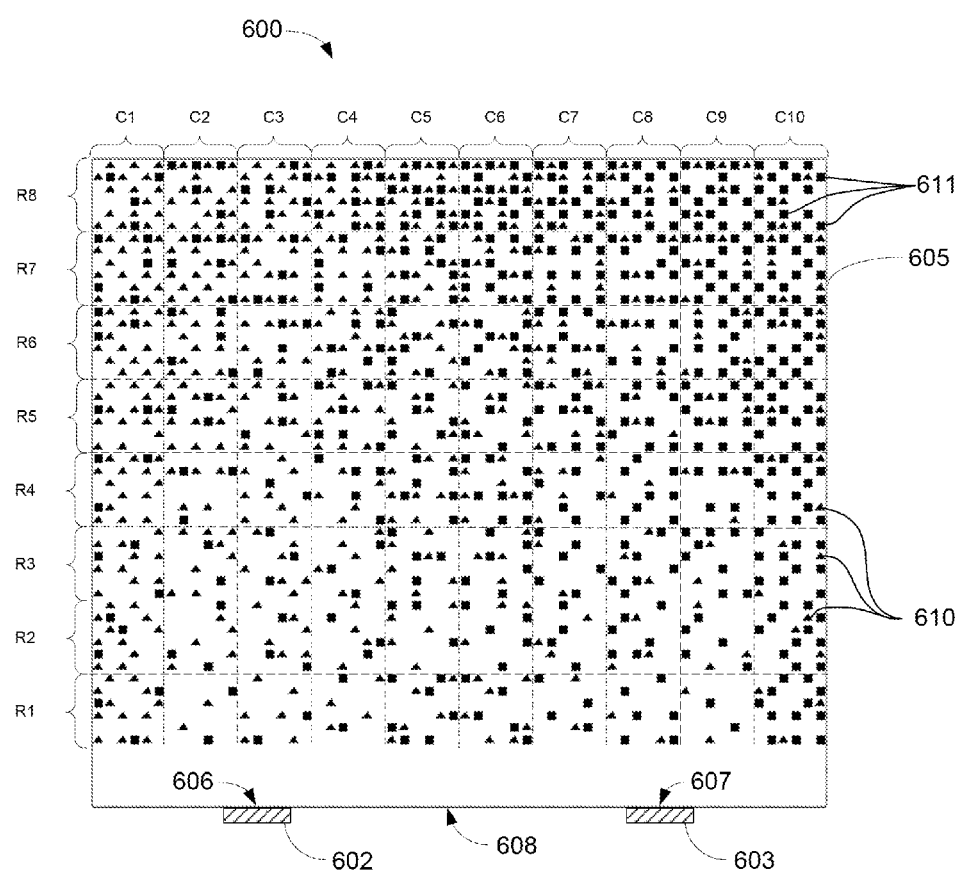
FIG. 6A is a top view of a sixth backlight system, according to an illustrative embodiment of the invention.

The backlight system 600 of FIG. 6A is another example of a backlight in which 3-dimensional control of emitted light is established by means of radial deflector patterns. The backlight system 600 includes two lamps 602 and 603, a light guide plate 605, and a plurality of deflectors 610 and 611. For purposes of illustration, the shapes of the deflectors are not shown in FIG. 6A. Instead, the positions of the deflectors 610 are indicated by triangles, and the position of deflectors 611 are indicated by squares. FIG. 6A thus illustrates the relative position and density of each group of deflectors 610 and 611 across the surface of the light guide plate 605. Optionally, the bottom surface of the light guide plate 605 is coated with or positioned proximate to a reflective metal surface.

The deflectors 610 can have trapezoidal cross sections, triangular cross sections, or any of the deflector cross sections described above. As in backlight system 400 and 500, each of the deflectors 610 and 611 possess a front face at least partially directed toward one of the lamps 602 or 603 or to a corresponding position 606 or 607 (referred to a light introduction position) on an edge 608 of the light guide plate 605. The normal to the front face of a deflector 610 or 611 lies in a plane that contains both the normal to the top surface of the light guide and a line substantially connecting the deflector to one of the lamps 602 or 603 or their corresponding light introduction positions 606 or 607 on the edge 608 of the light guide plate 605. Similarly, the front faces of the deflectors 610 and 611 intersect the bottom surface of the light guide at a line referred to herein as the "intersection line". Each deflector 610 and 611 is oriented such that its intersection line is substantially perpendicular to a line connecting the midpoint of the intersection line to a corresponding light introduction position 406 or 407.

The deflectors 610 and 611 possess both a long axis and a short axis. The deflectors 610 and 611 are arranged such that their long axis is substantially perpendicular to a ray of light emanating from one of either lamp 602 or 603, entering the light guide plate 605 at a corresponding light introduction position 606 or 607, and impinging on the deflector 610 at about the center of its front face. Similar to backlight system 300, the long axis of deflectors 610 and 611 are generally arranged along the circumference of circles which are centered on one or the other of the lamps 602 and 603.

Two groups or distinct populations of deflectors, A and B, exist within the backlight system 600. The two groups are distinguished by the square and triangle symbols. One population, A, made up of deflectors 610, is oriented so that their front faces are directed substantially toward the lamp 602 or to its corresponding light introduction position 606 on the edge 608 of the light guide plate 605. The other population of deflectors, B, made up of deflectors 611, shown by the square symbols, is oriented so that their front faces are substantially directed toward the lamp 603 or its corresponding light introduction position 607 on the edge 608 of the light guide plate 605. The populations A and B are intermixed.

To illustrate the distribution of deflectors in backlight 600, the backlight has been divided into 80 sections, labeled by rows (R1, R2, etc.) and columns (C1, C2, etc.). The deflectors 610 and 611 in the section labeled (R1,C3) are situated in proximity to lamp 602. For the most part only deflectors 610 from population A exist within section (R1,C3) and their density is relatively low.

The section labeled (R4,C1) is similarly populated primarily by deflectors 610 from population A, but the density of deflectors 610 in section (R4,C1) is substantially higher than those found in section (R1,C3).

The total density of deflectors 610 and 611 in section (R4,C6) is similar to that found in section (R4,C2); however, the section (R4,C2) is populated by deflectors from each of the populations A and B. Approximately equal numbers of deflectors from each of the populations 610 and 611 can be found within the section (R4,C2).

The total density of deflectors in section (R4,C9) is similar to that in section (R4,C10). In this case the section is populated primarily by deflectors 611 of population B, associated with lamp 603.

Each of the sections along row R8 has a total density of deflectors that is higher than the total density of deflectors in row R4. However each of the sections along row R8 includes a mingling of deflectors 610 and 611 from each of the populations A and B. In section (R8,C1) a greater fraction of the deflectors is assigned to deflectors 610 of population A. In section (R8,C10) a greater fraction is assigned to deflectors 611 or population B. And in section (R8,C6) the deflectors are about equally divided between the populations A and B.

Figure 6B:
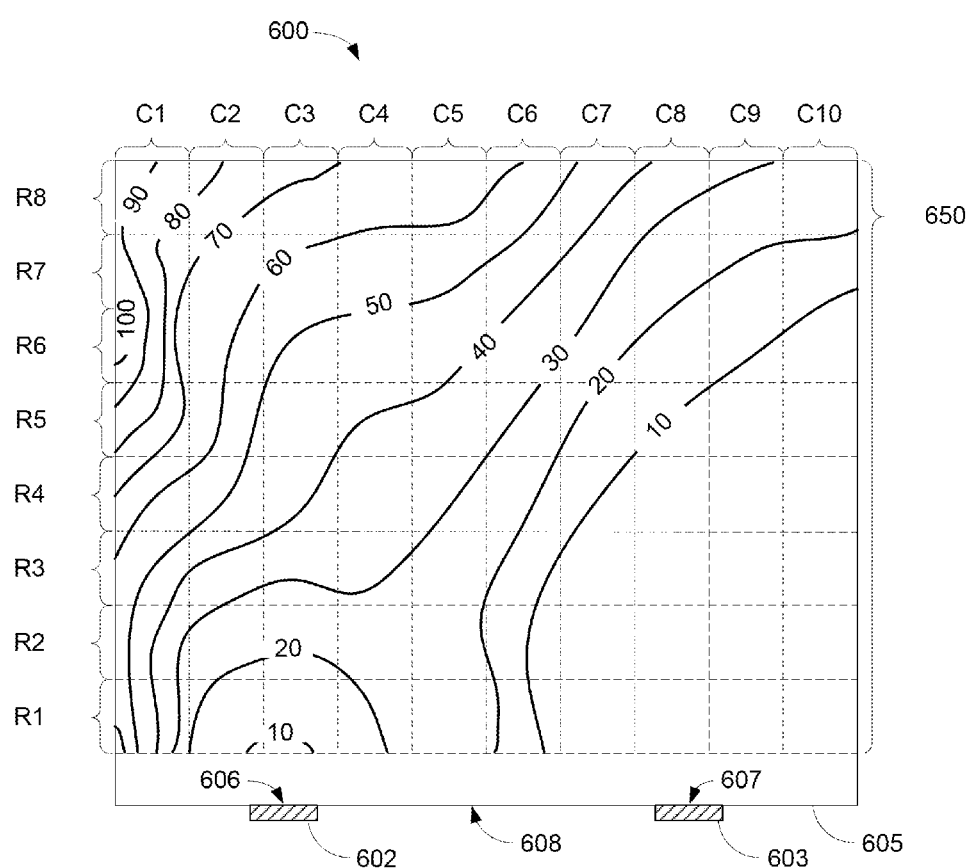
FIG. 6B is a density contour map indicating the density of one of two populations of light redirectors in the sixth backlight system, according to an illustrative embodiment of the invention.

FIG. 6B presents a density contour map 650, which illustrates the spatial distribution throughout light guide plate 605 of deflectors 610, i.e., deflectors from population A, of the backlight 600. The values associated with each contour are proportional to the number of population A deflectors per square millimeter within the contour. For instance, in one embodiment, the contour marked 10 corresponds to a density of 100 deflectors from population A per square millimeter while the contour marked 100 corresponds to density of 1000 deflectors per square millimeter. As shown in the density map 650, the highest density of deflectors 610 is found in the upper left hand corner, while the lowest density of deflectors 610 is found both immediately in front of the lamp 602 and in the lower right hand corner. For the most part, as one follows directional lines that emanate radially from the lamp 602 or its corresponding light introduction position 606, the density of deflectors 610 increases as the distance from the lamp 602 or light introduction position 606 increases. However for radial lines that pass into the right hand portion of the light guide plate 605 where the light intensity becomes dominated by light radiated from lamp 603, the density of deflectors in population A reaches a maximum value and then gradually or continuously decreases with distance from the lamp 602.

The density contour map 650 illustrates only the distribution of deflectors from population A of the backlight 600. A similar set of density contours exists, but is not shown, for the deflectors from population B. The density of deflectors from population B is highest near the upper right hand corner of the light guide plate 605.

In another embodiment the variation in density may not be proportionally as large as the variation from 10 to 100 as shown in FIG. 6B. Instead the deflector size may change continuously along with the density as a function of position within light guide. For instance the deflectors might be only 20 microns long in the region closest to the lamps 602 and 603 while at distances far away from the lamps the deflectors might be as long as 200 microns.

The backlight systems 400, 500, and 600 are examples of backlights that comprise 2 lamps spaced apart from one another. It will be understood that each of the lamps 402, 502, or 602 can in fact represent a plurality of lamps in a single package that occupy substantially the same position within the backlight. For instance a combination of red, green, and blue semiconducting light emitting diodes (LEDs) can be combined with or substituted for a white LED in a small chip, or assembled into a small multi-chip package. Similarly a lamp can represent an assembly of 4 or more color LEDs, for instance a combination of red, yellow, green, and blue LEDs. Other lamps that are useful for this invention include incandescent lamps, lasers, or field emission light sources.

In addition, in alternative embodiments backlight systems designed according to the principles described herein can include 3, 4, 5 or more lamps all spaced apart from one another. In some embodiments these lamps will be disposed along a single side of the light guide plate. In other embodiments these lamps will be disposed along two opposing sides of the light guide plate. Consistent with the descriptions of backlights 400 and 500, it will be advantageous to produce light guide plates that include multiple distinct populations of deflectors, often as many deflector populations as there are lamps. The deflectors within each population will have a front face which is substantially directed toward its associated lamp. Distinct deflector populations can be intermingled in specific regions of the light guide plate. For instance, in a backlight comprising four lamps, all spaced apart from one another, it is possible to find a region of the light guide plate where representatives of all four distinct populations coexist.

By use of the geometric light redirectors, the light guides of FIGS. 1-6 are capable of producing controlled divergence in emitted light. The cone of emitted light can be substantially limited to +/−50 degrees about the surface normal, and in some cases to within a cone of only +/−20 degrees. Because of imperfections in manufacturing, the luminance of emitted light from these light guides is not always a smoothly varying function of view angle. Further, when multiple colored LEDs are packaged together for the emitters, shown for instance at LED 202 or 502, it can arise that some colors of light (e.g. red) are emitted more strongly from the light guide at certain view angles relative to other colors in the LED package (e.g. blue and green). Such defects are sometimes referred to as color uniformity defects.

To overcome these and other optical imperfections, it can be useful to provide optical diffusing structures or diffuser sheets within or above the light guide. The diffusing structures can smooth out the angle to angle variations in emitted luminance. The diffusing structures, however, also significantly broaden the angular cone of light directed towards a viewer beyond the useful range of angles, thereby defeating some of the fundamental advantages of a light guide that incorporates prisms or geometric light redirectors.

There is a need in the art, therefore, for a method to smooth out variations in the emitted light profile from deflector-type light guides similar to those in FIGS. 1-6, without substantially broadening the cone of emitted light beyond a useful range of angles. There is also a need in the art to smooth out variations in the emitted light without substantially decreasing the on-axis luminance of light emitted from the deflector-type light guides.

These goals are met by the particular use and arrangement of transparent prism structures as described below. The transparent prisms provided are effective at smoothing out small angle variations in the luminance intensity of the overall backlight system without substantially altering the broader cone of light emitted from the light guide. Using the described arrangements of transparent prism structures, a particular luminous distribution of light that originates in the light guide can be substantially preserved, the color uniformity can be improved, and in many cases the on-axis luminance can be increased.

Figure 7:
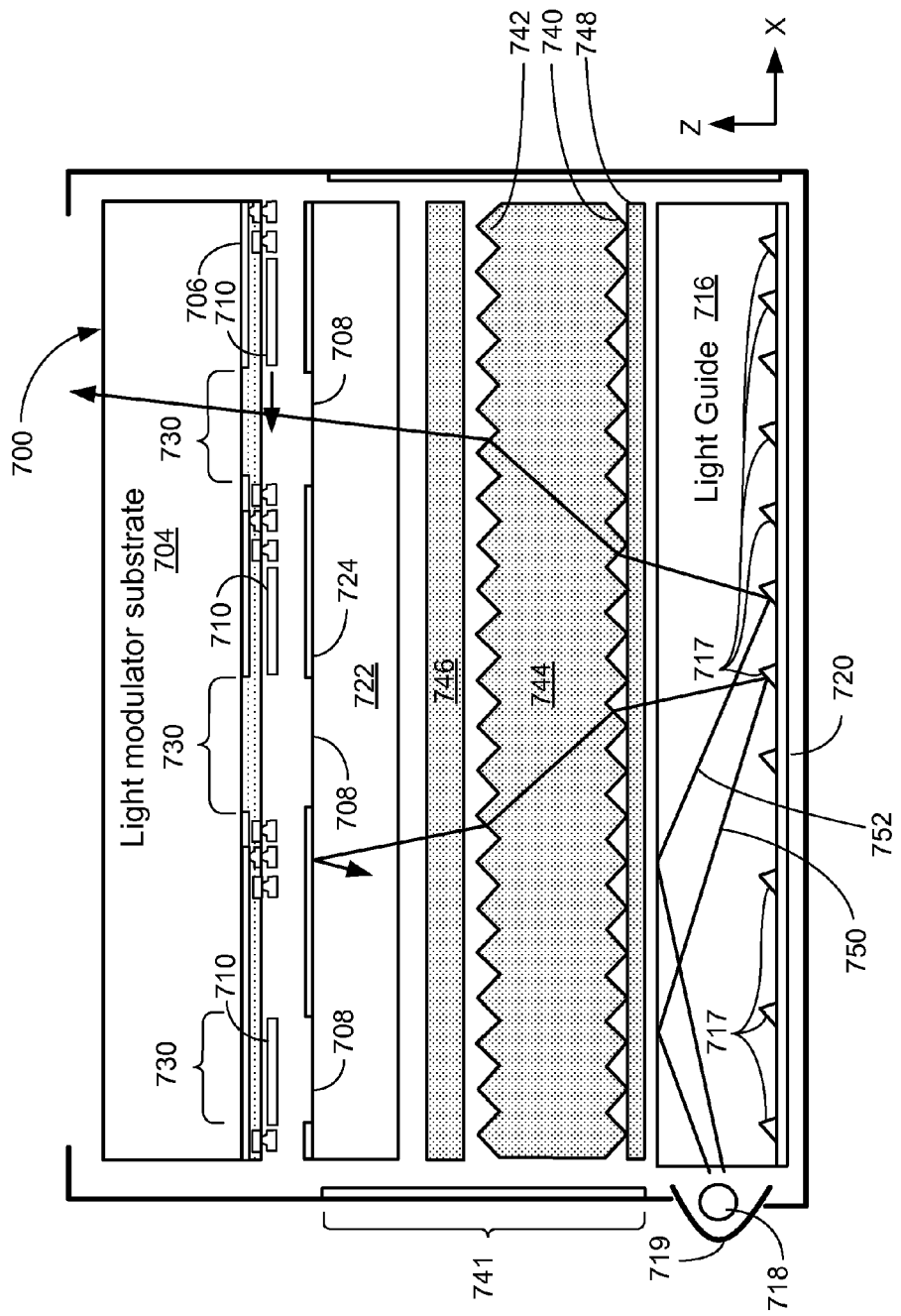
FIG. 7 is a cross sectional view of various components in a display apparatus according to an illustrative embodiment of the invention.

The above is accomplished by various combinations of light redirectors, illumination recycling, diffusers and prismatic light transmissive elements. FIG. 7 is a cross sectional view of a display assembly 700, according to an illustrative embodiment of the invention referred to as a MEMS-down modulator configuration. The display assembly 700 features a light guide 716, a reflective aperture layer 724, and a set of shutter assemblies, all of which are built onto separate substrates. The shutter assemblies are built onto substrate 704 and positioned such that the shutter assemblies are faced directly opposite to the reflective aperture layer 724.

The shutter assemblies comprise shutters 710 as well as a set of electrostatic actuators for each pixel in the modulator array. The shutters 710 represent one example of a micro-electro-mechanical or MEMS light modulator. A control matrix, including electrical interconnects, is also formed on the modulator substrate 704, by which electrical signals are transmitted from the host device for controlling the movement or actuation of each shutter 710 in the modulator array. The shutters 710 can be designed for digital operation, meaning that they are actuated into one of either a closed or open position across the apertures 708 in the aperture layer 724. The shutters 710 can also be designed for analog operation, meaning that the position of the shutters over the top of the apertures 708 can be controlled in variable fashion in correspondence with the light transmission requirements or gray scale for that particular pixel in the image to be displayed. The display assembly 700 does not include color filters for imparting color to the light transmitted through the apertures 708. Instead the display assembly 700 is configured for field sequential operation in which lamps 718 are provided with separate colors, e.g. red, green, and blue. A separate color sub-frame image can be displayed using the shutter array in a timed sequence synchronized with the illumination of, for example, the red, green, and blue lamps. If the switching frequency between the sub-frame images is fast enough, the viewer will perceive a single image comprising a large variation in color. In an alternate configuration, only a white lamp is provided for the lamp 718, and color filters are provided in front of each of the apertures 708 to impart color to the image.

When the array of MEMS modulators in display assembly 700, including shutters 710, is designed for digital operation, a gray scale method referred to as time division multiplexing can be utilized to provide multiple colors and/or multiple gray scale levels within a displayed image. In time division multiplexing, the time at which the shutters 710 are held in the open state for each of the sub-frame images can be controlled as a variable fraction of the image or frame time.

Further details on the design and operation of shutter-based MEMS light modulators, and their control for the formation of images can be found in co-pending U.S. patent application Ser. No. 11/643,042, incorporated herein in its entirety by reference.

The shutters-based MEMS light modulators illustrated in display assembly 700 are referred to as transverse light modulators, meaning that the shutter is designed so that it moves across the aperture 708 in a direction substantially transverse to the direction of the light passing through apertures 708. Alternate MEMS shutter-based modulators have been proposed and would be applicable for the displays in this invention, including a rolling actuator-based light modulator. Details on the rolling actuator-based light modulator can be found in U.S. Pat. Nos. 5,223,459 and 5,784,189, the entireties of which are incorporated herein by reference. A rolling actuator-based light modulator includes a moveable electrode disposed opposite a fixed electrode and biased to move in a preferred direction to produce a shutter upon application of an electric field.

Note that the display assembly 700 illustrates one exemplary embodiment the device, incorporating MEMS shutter-based light modulators, other embodiments include the use of other types of light modulators. The first of these alternative embodiments involves the use of a liquid crystal modulator array, well known in the art, as the modulator layer in place of the shutters 710.

In another embodiment an electrowetting-based modulator is incorporated into the MEMS-based display apparatus in place of the shutters 710. The electrowetting-based modulator depends on the motion of fluids, inks, or dyes over the front of an aperture, such as the apertures 708. The motion of the fluids can be controlled by either electrostatic actuation or by electrical alteration of the surface energies within individual droplets of the fluid or dye. Illustrative implementation of such electrowetting light modulators are described further in U.S. Patent Application Publication No. 2005/0104804, published May 19, 2005 and entitled "Display Device", incorporated herein in its entirety by reference.

The liquid crystal, rolling actuator, and electrowetting light modulators (as well as any arrays formed from a plurality of these) mentioned above are not the only examples of light modulators suitable for inclusion in various embodiments of the invention. It will be understood that other light modulators can exist and can be usefully incorporated into the invention.

In one embodiment, the vertical distance between the shutter assemblies and the reflective aperture layer is less than about 0.5 mm, although this distance is dependent of process. In an alternative embodiment the distance between the shutter assemblies and the reflective aperture layer is greater than 0.5 mm, but is still smaller than the display pitch. The display pitch is defined as the distance between pixels, and in many cases is established as the distance between apertures in the rear-facing reflective layer. When the distance between the shutter assemblies and the reflective aperture layer is less than the display pitch a larger fraction of the light that passes through the apertures will be intercepted by their corresponding shutter assemblies.

Display assembly 700 includes a light guide 716, which is illuminated by one or more lamps 718. The lamps 718 can be, for example, and without limitation, incandescent lamps, fluorescent lamps, lasers, or light emitting diodes (LEDs). The lamp assembly includes a light reflector or collimator 719 for introducing a cone of light from the lamp into the light guide within a predetermined range of angles.

The light guide includes a set of geometric light redirection structures or deflectors 717 which serve to re-direct light out of the light guide and along the vertical or z-axis of the display. The optical shapes, structures and configuration employed in deflectors 717 can be any of those described with respect to FIGS. 1 through 6A without limitation. The density of deflectors 717 varies with distance from the lamp 718, and is configured to create a predefined angular distribution of light.

The display assembly 700 includes a front-facing reflective layer 720, which is positioned behind the light guide 716. In display assembly 700, the front-facing reflective layer is deposited directly onto the back surface of the light guide 716. In other implementations the back reflective layer 720 is separated from the light guide by an air gap. The back reflective layer 720 is oriented in a plane substantially parallel to that of the reflective aperture layer 724.

Interposed between the light guide 716 and the shutter assemblies are various combinations of diffusers and a prismatic assembly 741. In one embodiment, the closest diffuser to the light guide is a heavy haze number (at or above 80%), high transmissivity diffuser sheet 748. This element helps with normalizing the illumination and reducing any hotspots.

Interposed between the light guide 716 and the shutter assemblies is an aperture plate 722. Disposed on the top surface of the aperture plate 722 is the reflective aperture or rear-facing reflective layer 724. The reflective layer 724 defines a plurality of surface apertures 708, each one located directly beneath the closed position of one of the shutters 710 of a shutter assembly. An optical cavity is formed by the reflection of light between the rear-facing reflective layer 724 and the front-facing reflective layer 720.

The aperture plate 722 can be formed from either glass or plastic. For the rear-facing reflective layer 724, a metal layer or thin film can be deposited onto the plate 722. Highly reflective metal layers can be fine-grained metal films without inclusions formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof. After deposition the metal layer can be patterned by any of a number of photolithography and etching techniques known in the micro-fabrication art to define the array of apertures 708.

In another implementation, the rear-facing reflective layer 724 can be formed from a mirror, such as a dielectric mirror. A dielectric mirror is fabricated as a stack of dielectric thin films which alternate between materials of high and low refractive index. A portion of the incident light is reflected from each interface where the refractive index changes. By controlling the thickness of the dielectric layers to some fixed fraction or multiple of the wavelength and by adding reflections from multiple parallel dielectric interfaces (in some cases more than 6), it is possible to produce a net reflective surface having a reflectivity exceeding 98%. Hybrid reflectors can also be employed, which include one or more dielectric layers in combination a metal reflective layer.

The substrate 704 forms the front of the display assembly 700. A low reflectivity film 706, disposed on the substrate 704, defines a plurality of surface apertures 730 located between the shutter assemblies and the substrate 704. The materials chosen for the film 706 are designed to minimize reflections of ambient light and therefore increase the contrast of the display. In some embodiments the film 706 is comprised of low reflectivity metals such as W or W—Ti alloys. In other embodiments the film 706 is made of light absorptive materials or a dielectric film stack which is designed to reflect less than 20% of the incident light.

Additional optical films can be placed on the outer surface of substrate 704, i.e. on the surface closest to the viewer. For instance the inclusion of circular polarizers or thin film notch filters (which allow the passage of light in the wavelengths of the lamps 718) on this outer surface can further decrease the reflectance of ambient light without otherwise degrading the luminance of the display.

Above the diffuser sheet 748 is the prismatic assembly 741, comprised of one or more rear-facing prisms 740, an optional middle diffuser sheet, and one or more front-facing facing prisms 742. Each of the rear-facing prisms 740 has an apex which faces toward the light guide 716. Each of the front-facing prisms 742 has an apex that faces away from the light guide 716. In some embodiments, either or both of a plurality of rear-facing and/or front-facing prisms may be combined to form a respective rear-facing or front-facing prism sheet. The grooves between prisms are oriented parallel to each other. In some embodiments, either as sheets or single portions, the rear-facing and/or front-facing prisms may be implemented as a single piece containing both.

In one embodiment, the prismatic assembly 741 may be created by the physical layering of the above elements through mechanical or chemical means, such as gluing or bonding. In another embodiment, the layering is accomplished by integrating all elements into a single piece. The optional central diffuser 744 may be either a clear or weak diffuser (with a low haze number at or below 20%), placed between the rear and front prisms to ensure the correct mechanical separation between the rear-facing and front-facing plurality of prisms or prism sheets. The prismatic assembly can be manufactured from substantially transparent plastic or glass. The prismatic assembly may be manufactured either by the embossing of a plastic sheet or by plastic injection molding.

In one embodiment, a top diffuser 746 is placed above the prismatic assembly 741. This top diffuser has a very low haze number (at or below 20%) and large transmissivity (above 90%). Its function is to further reduce any non-uniformity that may exit the prismatic assembly 741 or any of the optional diffusers below. The prisms of the front-facing 742 and rear-facing 740 sheets may be oriented (in rotation) to each other as well as to the light guide in an infinite number of orientation embodiments, primarily with respect to the light redirectors. Examples will be given below with respect to display assemblies 800 and 850. The pairing and correct orientation of both rear-facing and front-facing prism sheets, are arranged so as to not substantially alter the angular distribution of the light that passes through them, but instead to assist in ensuring that any light rays passing are within an optimal angle to the display.

The effect of the combination of rear-facing and front-facing prismatic structures and the light redirectors is best explained by illustrating the path of an example ray trace from light guide to the modulation assemblies in the example embodiment described in FIG. 7.

Recall that light rays leave the illumination source 718. Any light with a high angle will encounter the air gap between the light guide and the diffuser sheet 748 at a relatively low angle (relative to the normal). This causes the light ray to bounce down towards the rear of the light guide and the light redirectors located there. As we see in the example light ray 752, it then impacts the light redirecting structure 717, and is redirected upwards, at an angle that is close to orthogonal to the light guide (and most beneficial to the display user). The ray then passes through the diffuser sheet 748, followed by the prismatic assembly 741, first encountering the (as seen in FIG. 7) rear-facing prismatic structure 740. Depending on which prismatic facet it encounters, the light ray will turn to the right 752 or the left (as later seen on ray 750). Upon encountering the front-facing prismatic structure 742, the direction of the light ray is changed so that it again travels closer to the orthogonal direction. The ray 752 then goes through the top diffuser 746, the aperture plate 722, the surface aperture 708, and if the shutter is open, the surface aperture 730.

Note that in one embodiment, the portion of the aperture layer facing the light guide may be equipped with a reflective surface (as described in Hagood (U.S. Pat. No. 7,417,782) the entirety of which is incorporated herein by reference), referred to as a "reflective aperture layer" or as rear-facing reflective surface 724. When the aperture includes such a reflective layer, and a front-facing reflective layer 720 is placed behind the light guide, the system forms an optical cavity that allows for the recycling of light rays that do not immediately pass through the apertures. Such a case is illustrated by ray trace 750. In its case, the light reflected on the light redirector 717 follows a similar path to ray 752 (diffuser 748, rear-facing prismatic structure 740, optional middle diffuser 744, front-facing prismatic structure 742 and top diffuser 746). Except in this case, the light does not leave through an open shutter. In such a case, the light that does not leave through an open shutter is then reflected off the aperture layer 724, to be recycled and "bounce back up" either leaving through an open aperture, or recycling again.

Diffusers by themselves alter the angular distribution of light passing through them. In contrast, by combining a diffuser with the front-facing and rear-facing prisms, the benefits of a diffusers can be obtained without the downside of greater angular light dispersion.

The above coordination of the use of light redirectors, transparent prismatic structures and diffuser sheets allows for the forming of an image without substantial broadening of the cone of emitted light. The method includes providing an array of light modulators, which define a display surface, in proximity to an illumination system including a front-facing prism sheet, a rear-facing prism sheet and a light guide positioned below said rear-facing prism sheet. The light guide has front and rear surfaces and a plurality of geometric light redirectors formed therein. As seen, the light emitted by the one or more light sources travels towards the plurality of light redirectors. Light that would normally be lost is redirected into the useful range by the light redirectors, and towards the display surface.

As described, the light coming to the display will improve in normalization and other optical qualities by the inclusion of diffusers of varying haze number and transmissivity within the optical path. In one embodiment of the method, this may involve the use of a high haze number diffuser 748 between the light guide 716 and the prismatic assembly 741. In another embodiment, this may be accomplished by the use of a low haze number diffuser sandwiched between the one or more rear-facing prisms 740 and the forward-facing ones 742. In one embodiment of the method, the light is reflected such that the intensity of the redirected light within the useful range of angles about the display axis is at least 50% of the initial total light intensity.

Figure 8A:
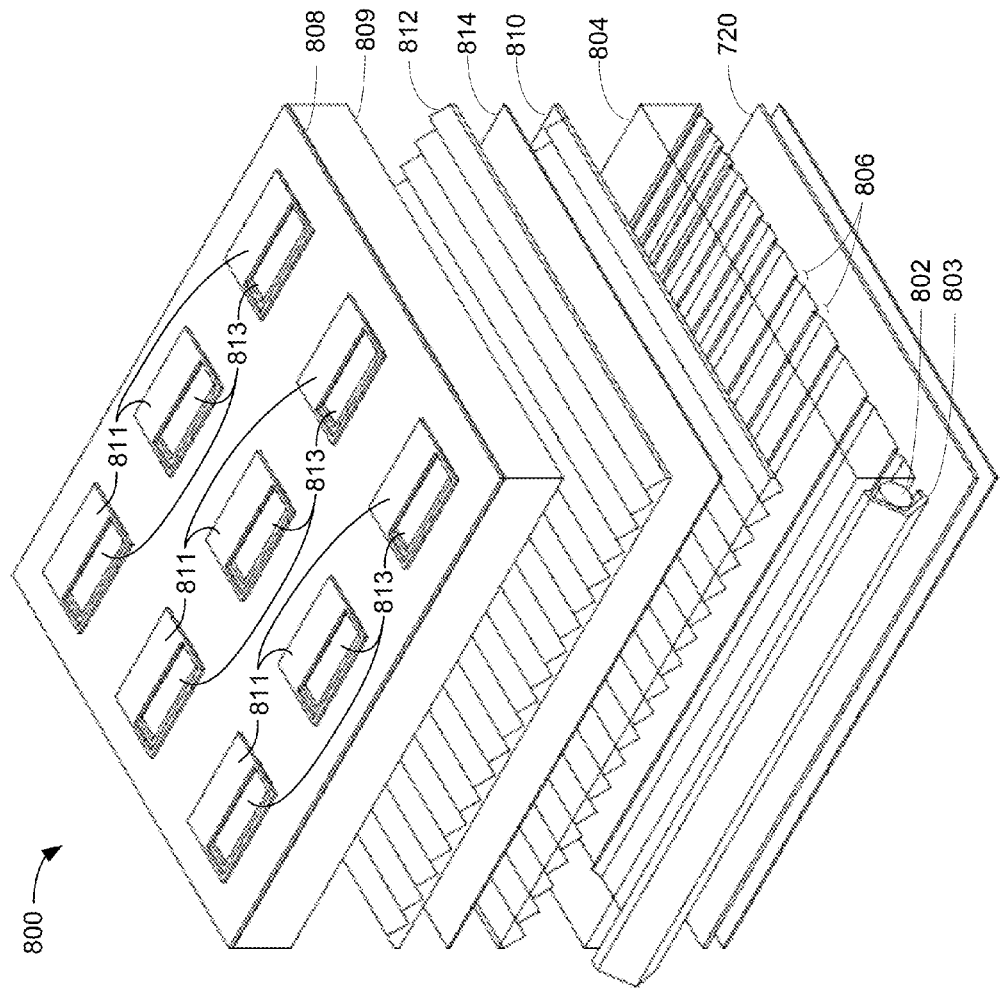
FIGS. 8A and 8B are example assembly drawings of various components in a display apparatus according to an illustrative embodiment of the invention.

The display assembly 800 of FIG. 8A is another example embodiment of a display apparatus in which 3-dimensional control of angular divergence is established. The display assembly 800 includes a one or more lamps 802, a lamp housing 803, a light guide 804, a series of light redirectors 806, a light modulator plate 808 with shutters 811, a prismatic assembly comprising rear-facing prisms 810, an optional central diffuser 814 and front-facing prisms 812. The light modulator plate 808 contains a reflective aperture layer 809 that defines an array of apertures 813. The reflective aperture layer 809 is similar in construction to the aperture layer 724 of display assembly 700, except that the aperture layer 809 is built directly onto the light modulator plate 808.

The rear-facing prism structures (which may be accumulated to form a sheet) assembly 810 has two faces: A rear-face which faces the light guide 804 and a flat face which faces away from the light guide 804. The front-facing prism structures (which may also me accumulated to form a sheet) assembly 812 conversely also has two faces, a rear face which is flat and faces the rear-facing prism sheet 810, and a front face which includes a series of prism structures and which faces away from the rear-facing prism sheet 810 (as well as the light guide 804). The rear-facing prism sheet is located between the front-facing prism sheet and the light guide 804. The front and rear-facing prism sheets can be manufactured from substantially transparent sheets of plastic or glass.

The prisms of the rear-facing 810 and front-facing 812 sheets may be oriented (in rotation) to each other as well as to the light guide in an infinite number of orientation embodiments, primarily with respect to the light redirectors. To assist in referencing the axes, we refer to a light guide where the light source (or sources) are located along one edge of the light guide. In this case, the Y-axis is located along the line in which the light source (or sources) are deployed, and the X-axis is orthogonal to it in the direction of the "back" of the light guide. In the display assembly 800 the light redirectors 806 are long cylindrical structures which are all oriented parallel to the y-axis. In other embodiments, similar to those shown for backlight systems 400 and 500, the light redirectors are not arranged in parallel fashion, but may be arranged to face individual lamps, such as lamps 502 and 503. In all of these embodiments, the y-axis is defined by that edge of the light guide which contains the lamp or lamps.

Note that the rotation of the prisms sheets is dual, that is, the rear-facing prism (or prism sheet) 810 may be rotated in relation to the light redirectors 806 so that its parallel prisms are oriented in positions ranging from parallel to the X-axis (as shown in FIG. 8A), past 45 deg. to orthogonal (defined as 90 deg., or parallel to the Y-axis) through to 135 deg. and all the way back to parallel with the X-axis again (that is 180 deg.). Similarly, the front-facing prism (or prism sheet) 812 may similarly (and independently) be rotated as described for the rear-facing prism sheet 810. Table 1 lists a sub-set illustrating a number of the proposed embodiments we have found to exhibit some advantages in concentrating light. Note that Table 1 illustrates only a few limiting cases of the possible arrangements for the prism sheets 810 and 812. Any of a number of intermediate angular relationships between the prism sheets, or between the prism sheets and the light redirectors are possible.

TABLE 1

Exemplary Embodiments of Prism rotations relative to X-direction Axis

| Prism Rotation Angle to X-direction | Ex 1 | Ex 2 | Ex 3 | Ex 4 | Ex 5 | Ex 6 | Ex 7 | Ex 8 |
|---|---|---|---|---|---|---|---|---|
| Front-Facing Prism | 90 | 90 | 45 | 90 | 45 | 0 | 135 | 0 |
| Rear-Facing Prism | 0 | 90 | 45 | 45 | 0 | 0 | 0 | 135 |

In alternate embodiments the prisms within a given prism sheets need not be oriented parallel to each other. In some embodiments the prism orientation is randomized. Additional alternative prism configurations are described in U.S. Pat. No. 7,046,905 to Gardiner, the entirety of which is incorporated herein by reference. For example, in other orientations, the prisms are oriented in a curved fashion so as to parallel the arrangement of the light redirectors, such as light redirectors 510 in backlight system 500.

The choice of relative orientation of rear and front prisms to each other and to the light guide can be influenced by the manufacturing tolerance at which the light redirector 717 creation process is capable. Recall that the light redirectors 130 (or deflectors) are formed on the bottom surface of light guide 125. In one embodiment, these will be created by injection molding, and this process tends to have variations in both the location and the shape of the redirector polygon. In some cases, the location and alignment of the polygon may not be optimal. In others, the process may fail to create a perfect polygon (with sharp, equal facets along its length).

Note that these process variations may be quality issues, but in general are much more driven by process characteristics. That is, the problem is not whether tolerances "creep" from batch to batch, but whether the minimal tolerance that can be adhered to creates a light redirector with a permanent bias at minimal acceptable tolerances. This bias may then be corrected by the rotational variation between the rear-facing and the front-facing prism structures. Thus, depending on the process used by a supplier, the prisms structures of the front-facing prisms may be adjusted to an angle conducive to maximizing the light normal to the display as seen by the user. Note that in addition, varying both prisms alignments to each other and the light guide may be also beneficial in creating displays with a built in bias on its main axis of illumination, allowing designers to "steer" the optimal viewing angle for a display/application combination.

In the embodiment illustrated with respect to display assembly 800, the grooves or ridges in both rear-facing and front-facing prism sheets 810 and 812 are aligned parallel to the x axis. This has been found to be optimal when the tolerances in the light redirector features are closest to the ideal, that is, when the actual light deflectors approximate the intended shape the closest.

Figure 8B:
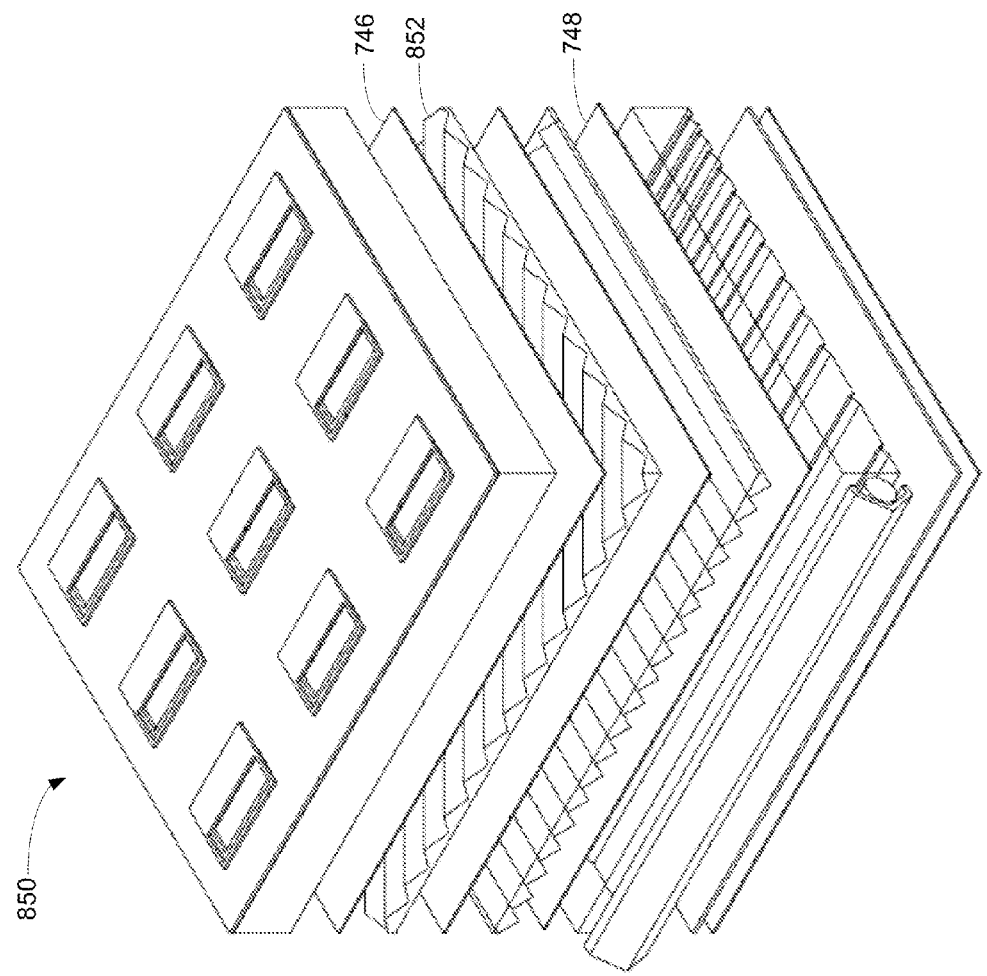

The display assembly 850 of FIG. 8B is another example embodiment of a display apparatus in which 3-dimensional control of angular divergence is established. Display assembly 850 is formed primarily of the same elements as display assembly 800, with three major changes. The first is optional diffuser 746, located between the front-facing prismatic structure 852 and the modulator plate 808. As discussed before, this is a very low haze number (at or below 20%) and large transmissivity (above 90%) diffuser whose primary function is to further reduce any non-uniformity transmitted through the front-facing prismatic structure 852.

The second optional diffuser 748 is in one embodiment located above the air gap above the light guide 804 and below rear-facing prismatic structure 810. In one embodiment, it is a heavy haze number (at or above 80%), high transmissivity diffuser. This element helps with normalizing the illumination and reducing any hot-spots from the light redirectors below.

The third element is the front-facing prismatic structure 852. This is located in the same portion of the optical path as that in FIG. 8A (labeled 812), but in this embodiment it has been rotated 45 deg. to the X-axis. The orientation of the prism sheets 810 and 852 in display assembly 850 corresponds to that shown for Example 5 in Table 1.

As stated above, manufacturing processes for the light redirectors 806 vary, forcing the prismatic assembly to account for these process variations. Thus, as seen in the variations between FIGS. 8A and 8B, the front-facing prisms (812 vs. 852) can account for this process variation by being rotated 45 deg. to the rear-facing prisms 810 in one example configuration, and effectively in any infinite number of angles once the optimal angle rotation is determined by process control evaluation of the selected light redirector manufacturing process.

Many variations and modifications can be made to the embodiments described above without substantially departing from the principles of the present invention. Also, such variations and modifications are intended to be included herein within the scope of the present invention as set forth in the appended claims. The invention may be embodied in other specific forms without departing form the spirit or essential characteristics thereof. The forgoing embodiments are therefore to be considered in all respects illustrative, rather than limiting of the invention.

We claim:

1. A display comprising:
   an array of light modulators defining a display surface;
   a light guide having front and rear surfaces and a plurality of geometric light redirectors formed within the light guide;
   a front-facing prism sheet that includes a first layer of prisms;
   a rear-facing prism sheet that includes a second layer of prisms; and
   a diffuser between the front-facing prism sheet and the rear-facing prism sheet, each of the first layer of prisms and second layer of prisms being located between the light guide and the display surface, wherein the front-facing prism sheet faces the array of light modulators and the rear-facing prism sheet faces the light guide.

2. The display of claim 1, wherein the array of light modulators includes a plurality of MEMS-based light modulators.

3. The display of claim 1, wherein the geometric light redirectors are spatially configured to create a predefined angular distribution of light.

4. The display of claim 3, wherein the first layer of prisms and second layer of prisms are arranged so as to not substantially alter the angular distribution of the light created by the geometric light redirectors.

5. The display of claim 1, wherein the second layer of prisms is located between the first layer of prisms and the front surface of the light guide.

6. The display of claim 1, wherein the array of light modulators includes one of a plurality of liquid crystal based light modulators, a plurality of rolling actuator based light modulators, and a plurality of electrowetting light modulators.

7. The display of claim 1, wherein the first and second layers of prisms are contained entirely within an optical cavity.

8. The display of claim 1, wherein a front-facing reflective layer is provided behind the rear surface of the light guide.

9. The display of claim 1, wherein a rear-facing reflective layer is provided between the array of light modulators and the first layer of prisms.

10. The display of claim 1 wherein the orientation of the first layer of prisms is rotated up to 45 degrees with respect to the orientation of the second layer of prisms.

11. A method of manufacturing a display, comprising:
providing a light guide including a plurality of geometric light redirectors within the light guide;
providing an array of light modulators to define a display surface;
providing a first layer of prisms adjacent to the light guide;
providing a second layer of prisms adjacent to the array of light modulators;
aligning an orientation of at least one of the first layer of prisms and the second layer of prisms at a first angle with respect to an orientation of the geometric light redirectors of the light guide; and
aligning the orientation of the first layer of prisms at a second angle with respect to the orientation of the second layer of prisms, wherein the second angle is up to 45 degrees.

12. An apparatus, comprising:
an array of light modulators defining a display surface;
a light guide having a plurality of geometric light redirectors formed within the light guide;
a first layer of prisms;
a second layer of prisms; and
each of the first layer of prisms and second layer of prisms being between the light guide and the display surface, wherein an orientation of prisms in the first layer of prisms is at an angle of up to 45 degrees with respect to the orientation of prisms in the second layer of prisms.

13. The apparatus of claim 12, further comprising:
a front-facing prism sheet that includes the first layer of prisms; and
a rear-facing prism sheet that includes the second layer of prisms, wherein the front-facing prism sheet faces the array of light modulators and the rear-facing prism sheet faces the light guide.

14. The apparatus of claim 13, further comprising a diffuser between the front-facing prism sheet and the rear-facing prism sheet.

15. The apparatus of claim 13, further comprising a diffuser between the light guide and the rear-facing prism sheet.

16. The apparatus of claim 12, wherein the first layer of prisms and the second layer of prisms are between the light guide and the display surface.

17. The apparatus of claim 12, wherein the first layer of prisms and the second layer of prisms form opposing sides of a single prism sheet.

* * * * *